US010451375B2

(12) United States Patent
Wynes et al.

(10) Patent No.: US 10,451,375 B2
(45) Date of Patent: Oct. 22, 2019

(54) SOFT RECOIL SYSTEM

(71) Applicant: Mandus Group, Ltd., Rock Island, IL (US)

(72) Inventors: Kenneth Wynes, Milan, IL (US); Gary Bowrey, Bettendorf, IA (US)

(73) Assignee: Mandus Group LLC, Rock Island, IL (US)

(*) Notice: Subject to any disclaimer, the term of this patent is extended or adjusted under 35 U.S.C. 154(b) by 0 days.

(21) Appl. No.: 15/669,691

(22) Filed: Aug. 4, 2017

(65) Prior Publication Data

US 2017/0328667 A1 Nov. 16, 2017

Related U.S. Application Data

(63) Continuation of application No. 14/803,975, filed on Jul. 20, 2015, now Pat. No. 9,746,269, which is a continuation of application No. 13/903,650, filed on May 28, 2013, now Pat. No. 9,115,946, which is a continuation of application No. 13/452,674, filed on Apr. 20, 2012, now Pat. No. 8,468,928.

(60) Provisional application No. 61/478,053, filed on Apr. 21, 2011.

(51) Int. Cl.

| | |
|---|---|
| ***F41A 25/20*** | (2006.01) |
| ***F41A 25/02*** | (2006.01) |
| ***E05B 63/12*** | (2006.01) |
| ***F41A 5/36*** | (2006.01) |
| ***F16B 17/00*** | (2006.01) |

(52) U.S. Cl.
CPC ............ *F41A 25/02* (2013.01); *E05B 63/122* (2013.01); *F16B 17/00* (2013.01); *F41A 5/36* (2013.01); *F41A 25/20* (2013.01); *Y10T 403/591* (2015.01); *Y10T 403/7075* (2015.01)

(58) Field of Classification Search
CPC ........... F41A 25/02; F41A 25/04; F41A 25/20
See application file for complete search history.

(56) References Cited

U.S. PATENT DOCUMENTS

| | | | |
|---|---|---|---|
| 891,778 | A | 6/1908 | Mertens |
| 955,795 | A | 4/1910 | Haussner |
| 958,119 | A | 5/1910 | Haussner |
| 986,387 | A | 3/1911 | Haussner |
| 988,776 | A | 4/1911 | Haussner |
| 994,156 | A | 6/1911 | Haussner |
| 997,912 | A | 7/1911 | Haussner |

(Continued)

FOREIGN PATENT DOCUMENTS

| | | | |
|---|---|---|---|
| FR | 374110 | * | 6/1907 |

*Primary Examiner* — Stephen Johnson
(74) *Attorney, Agent, or Firm* — Dorsey & Whitney LLP

(57) ABSTRACT

One embodiment of a gun configured with the soft recoil system comprises a plurality of recoiling parts that initially moves in the direction of the projectile being fired before moving in a direction opposite to that of a projectile during the firing of the round. The soft recoil system throttles the movement of the recoiling parts such that the energy expended during the firing of the round is spread over a longer time period and a longer distance than would normally occur. The soft recoil system stores at least a portion of the energy transferred to the recoiling parts and the user may selectively release at least a part of that portion of energy to offset the energy imparted to the gun during the firing of the next round.

16 Claims, 21 Drawing Sheets

(56) References Cited

U.S. PATENT DOCUMENTS

| | | | | | |
|---|---|---|---|---|---|
| 1,072,350 | A | | 9/1913 | Mueller | |
| 1,347,803 | A | | 7/1920 | Bourdelles | |
| 1,650,752 | A | | 11/1927 | Zimmerman | |
| 1,764,895 | A | | 6/1930 | Segal | |
| 1,895,631 | A | | 1/1933 | Kemp | |
| 2,193,446 | A | | 3/1940 | Caulkins | |
| 3,114,291 | A | | 12/1963 | Ashley | |
| 3,483,648 | A | | 12/1969 | Stephen | |
| 3,566,740 | A | * | 3/1971 | Williams | F41A 19/55<br>89/170 |
| 3,745,880 | A | * | 7/1973 | Metz | F01B 17/00<br>89/43.01 |
| 4,043,250 | A | | 8/1977 | Wiese | |
| 4,587,882 | A | | 5/1986 | Metz | |
| 4,774,873 | A | * | 10/1988 | Shoales | F41A 25/20<br>89/198 |
| 4,833,808 | A | | 5/1989 | Strahan | |
| 4,945,813 | A | | 8/1990 | Moscrip et al. | |
| 5,491,917 | A | | 2/1996 | Dilhan et al. | |
| 5,497,704 | A | | 3/1996 | Kurschner et al. | |
| 6,024,007 | A | | 2/2000 | Searle et al. | |
| 6,392,213 | B1 | | 5/2002 | Martorana et al. | |
| 6,536,324 | B1 | | 3/2003 | Boissiere et al. | |
| 6,595,103 | B1 | | 7/2003 | Kathe | |
| 6,644,168 | B1 | | 11/2003 | Browne et al. | |

* cited by examiner

SOFT RECOIL SYSTEM

CROSS-REFERENCE TO RELATED APPLICATIONS

This application claims priority from and is a continuation of U.S. patent application Ser. No. 14/803,975 filed on Sep 20, 2015, now U.S. Pat. No. 9,746,269, which application claimed priority from and was a continuation of U.S. patent application Ser. No. 13/903,650 filed on May 28, 2013, now U.S. Pat. No. 9,115,946, which application claimed priority from and was a continuation of U.S. patent application No. 13/452,674 filed on Apr. 20, 2012, now U.S. Pat. No. 8,468,928, which application claimed the filing benefit under 35 U.S.C. § 119(e) of provisional U.S. patent application No. 61/478,053filed on Apr. 21, 2011, both of which are incorporated by reference herein in their entireties.

FIELD OF INVENTION

This invention relates generally to recoil systems for weaponry.

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISK APPENDIX

Not Applicable

BACKGROUND OF THE INVENTION

Artillery weapons have been used for hundreds of years. These weapons have been continuously developed to improve accuracy, effectiveness, and efficiency. For example, U.S. Pat. Nos. 4,945,813; 6,024,007; and 6,595,103 disclose various designs for gun systems, all of which patents are incorporated by reference herein in their entireties.

When an artillery weapon is fired, the energy of the round must be absorbed by the weapon's structure and eventually transmitted to the ground. Modern artillery systems incorporate recoil mechanisms to modulate the forces associated with these firings to a level that can be effectively and reliably supported by the structure. With some recoil mechanisms, the energy of the round is dissipated by throttling fluid over the length of the recoil. The minimum level of this modulating force is directly proportional to the length of recoil.

In a soft recoil system, the recoiling parts are accelerated forward prior to the firing of the round by an internal gas spring. When the round is fired, nearly half of the energy of the round is used to stop the forward motion of the recoiling parts and the remaining energy is used to force the recoiling parts rearward, recompressing the gas spring. The recoiling parts are then captured by a latch in preparation for the next firing. This use of momentum exchange and energy conservation by the soft recoil technique results in recoil force reductions as high as 75% when compared to conventional recoil systems.

Although the soft recoil technique offers considerable advantages, there are some drawbacks associated with the cycle. Among these are: (1) A different run-up velocity is required for each of the different zones/charges being fired to maximize the benefits, (2) If the round fails to fire during the run up (known as a misfire), the buffing load required to bring the forward velocity of the recoiling parts to zero may be high enough to cause some weapon instability, and (3) If the round fires prematurely from the latch position (known as a "cookoff"), the conventional recoil-style buffer rearward of the latch point may induce sufficient forces to cause the weapon to slide rearward or become unstable.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
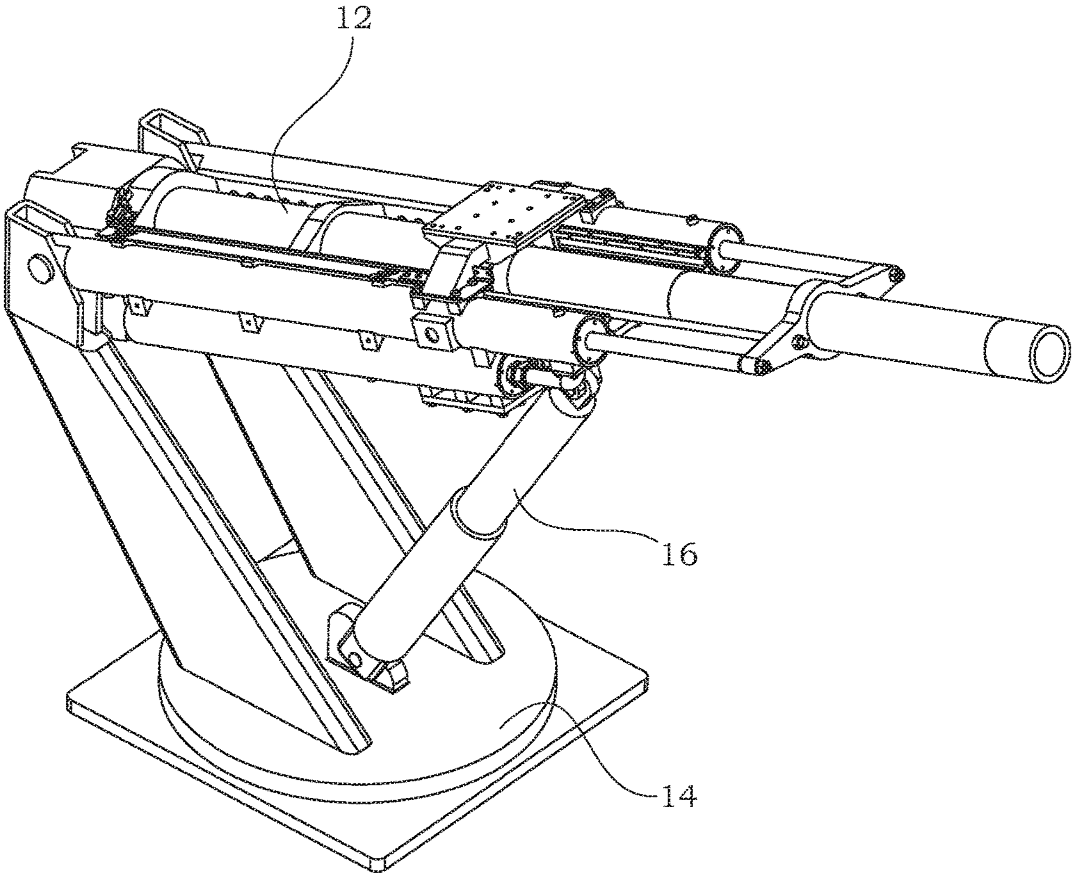
FIG. 1 is a perspective view of a first embodiment of a gun with a soft recoil system engaged therewith, wherein the gun is mounted to a base.

| ELEMENT DESCRIPTION | ELEMENT # |
|---|---|
| Soft recoil system | 10 |
| Gun | 12 |
| Base | 14 |
| Actuator | 16 |
| Barrel | 20 |

-continued

| ELEMENT DESCRIPTION | ELEMENT # |
|---|---|
| Breech | 24 |
| First rail | 28 |
| Second rail | 30 |
| Rear yoke | 32 |
| Middle yoke | 34 |
| Forward yoke | 36 |
| Latch point | 36a |
| Muzzle yoke | 38 |
| Flange | 39 |
| Tie rod | 40 |
| First rail guide | 50 |
| First recoil cylinder | 51 |
| First recoil rod | 52 |
| First forward end | 53 |
| First recuperator | 56 |
| Mounting bracket | 57 |
| Crossover bracket | 59 |
| Second rail guide | 60 |
| Second recoil cylinder | 61 |
| Second recoil rod | 62 |
| Second forward end | 63 |
| Recoil piston | 64 |
| Lubricant groove | 64a |
| Transfer manifold | 65 |
| Second recuperator | 66 |
| Floating piston | 67 |
| First recuperator chamber | 68 |
| Second recuperator chamber | 69 |
| Outer cylinder | 71 |
| End seal | 72 |
| Partition | 74 |
| Port | 75 |
| Forward outer chamber | 77 |
| Rear outer chamber | 78 |
| Inner cylinder | 81 |
| Stuffing box | 82 |
| Stop element | 83 |
| Forward inner chamber | 84 |
| Rear inner chamber | 85 |
| First fluid passage | 87 |
| Second fluid passage | 88 |
| Third fluid passage | 89 |
| Fourth fluid passage | 90 |
| Fifth fluid passage | 92 |
| Larger fluid passage | 93 |
| Sixth fluid passage | 94 |
| Check valve | 100 |
| Check valve fluid passage | 101 |
| Flange portion | 102 |
| Sleeve portion | 103 |
| First collar portion | 104 |
| Finger portion | 105 |
| Intermediate collar portion | 106 |
| Peripheral collar portion | 108 |
| Relief fluid passage | 108a |
| Counter-recoil control system | 110 |
| Counter-recoil control valve | 112 |
| Control valve pivot point | 114 |
| Misfire recovery system | 130 |
| Misfire valve | 132 |
| Misfire valve flange | 132a |
| Misfire valve sleeve | 132b |
| Misfire valve fluid passage | 132c |
| First barrier | 134 |
| Second barrier | 136 |
| Latch mechanism | 200 |
| Housing | 202 |
| Stop wall | 202a |
| Crank aperture | 204 |
| Latch assembly aperture | 206 |
| Housing cover | 208 |
| Trip assembly bracket | 208a |
| Cover aperture | 208b |
| Crank | 210 |
| Crank mount | 212 |
| Lever member | 213 |
| Crank arm | 214 |

-continued

| ELEMENT DESCRIPTION | ELEMENT # |
|---|---|
| Rotational biasing member | 215 |
| Link | 220 |
| Link first end | 222 |
| Link second end | 224 |
| Trip assembly | 230 |
| Trip mount | 232 |
| Lever member engager | 234 |
| Bar | 236 |
| Latch assembly | 240 |
| Latch body | 241 |
| Latch assembly mount | 242 |
| Link connector | 243 |
| Plunger | 244 |
| Plunger face | 244a |
| Plunger ramp | 244b |
| Biasing member | 245 |

DESCRIPTION OF THE ILLUSTRATIVE EMBODIMENTS

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. The term "recoiling parts" as used herein generally refers to those elements of a piece of a gun 12 and/or a soft recoil system 10 that move in response to the energy of expending a round in the gun 12. This term may encompass, but is not limited to, the barrel 20, muzzle brake, breech 24, first rail 28, second rail 30, rear yoke 32, middle yoke 34, forward yoke 36, muzzle yoke 38, flange 39, tie rod 40, first recoil rod 52, second recoil rod 62, and recoil piston 64 (although the recoil rods 52, 62 and recoil piston 64 may also be considered as part of the soft recoil system 10).

One embodiment of an artillery weapon, such as a howitzer (or more generally, gun 12), may be mounted to a base 14 and include a soft recoil system 10 as shown in FIG. 1. The base 14 may be rotatable with respect to the structure to which it is mounted to allow a user to change the orientation of the gun 12. The actuator 16 may be cooperatively engaged at a first end thereof with the base 14 and at a second end thereof with a portion of the gun 12 to adjust the vertical angle of the gun 12 with respect to the base 14. Other structures and/or methods may be used to change the orientation of the gun 12 without limitation, and will not be discussed further herein for purposes of brevity. The soft recoil system 10 may be mounted in any manner suitable for the use for which the gun 12 is designed. Such mountings include but are not limited to vehicle mounts, chassis mounts, and skid mounts.

Figure 2:
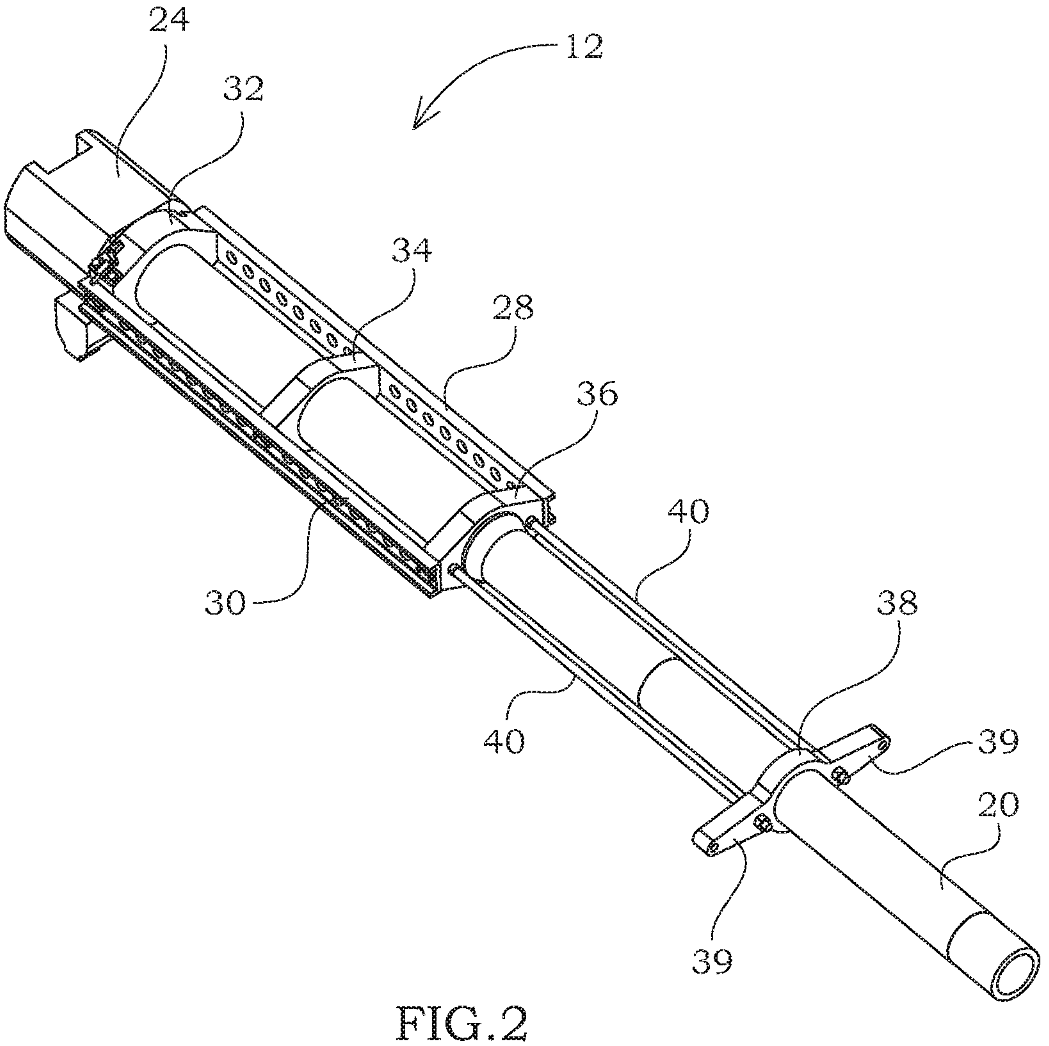
FIG. 2 is a perspective view of the gun of FIG. 1 wherein various elements of the soft recoil system and base have been removed for clarity.

A gun 12 without a soft recoil system 10 and removed from a base 14 is shown in FIG. 2. The gun 12 generally includes an elongated, hollow barrel 20 through which a shell/cartridge/round is fired. The barrel 20 may include a muzzle brake (not shown) at its forward end, and a breech 24 at its rearward end. Rails or channels 28, 30 may be positioned on opposite sides of the barrel 20 and extend parallel to the longitudinal axis of the barrel 20. The rails may be firmly retained in place by a plurality of yokes 32, 34, 36; a first or rear yoke 32, a second or middle yoke 34, and a third or forward yoke 36 attached to an intermediate portion of the barrel 20. The yokes 32, 34, 36 circumferentially clasp or are secured to the barrel 20 at positions along its longitudinal axis. The forward yoke 36 may include a latch point **36*a* to provide an interface between the recoiling parts and the latch mechanism 200**, which is described in detail below.

In addition, a muzzle yoke 38 may circumferentially clasp an intermediate portion of the barrel 20 at a position that is spaced from and forward of the third yoke 36. The muzzle yoke 38 may be configured to include a pair of opposed end portions or flanges 39, which extend generally transverse to the longitudinal axis of the barrel 20 as shown in FIG. 2. Each flange 39 may be formed with a cylindrical-shaped bore or passage formed therein, wherein the central axes of the passages may extend generally parallel to the longitudinal axis of the barrel 20. At least one tie rod 40, two of which are shown in FIG. 2, may be disposed on opposite sides of the barrel 20. Each tie rod 40 may extend through aligned apertures in yoke 32, 34, and/or 36 and flanges 39 of muzzle yoke 38. The tie rods 40 may be retained in position by a suitable attaching member, such as a lock nut, welding, or other structures and/or methods suitable to the particular embodiment of the gun 12. In the illustrative embodiment of the soft recoil system 10, two tie rods 40 are simultaneously engaged with the forward yoke 36 and the muzzle yoke 38. However, the soft recoil system 10 may include tie rods 40 engaging other and/or additional yokes 32, 34, 36, and 38 without limitation. Alternatively, muzzle yoke 38 may be mounted directly to barrel 20 without tie rods 40.

Figure 3:
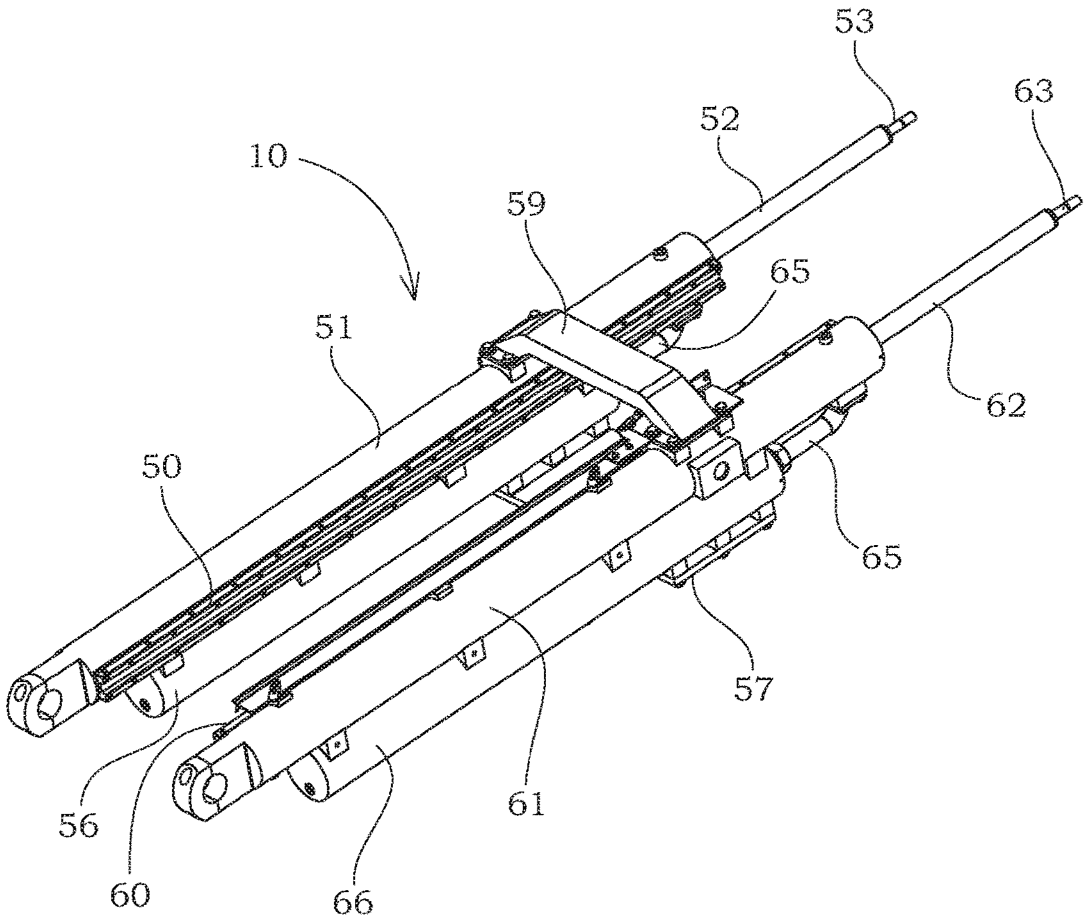
FIG. 3 is a perspective view of the embodiment of a soft recoil system shown in FIG. 1.

FIG. 3 provides a perspective view a soft recoil system 10 having a cradle configuration for use with the embodiment of a gun 12 shown of FIG. 2. To provide recoil control, the illustrative embodiment of the soft recoil system 10 is formed with two hydro-pneumatic systems that are essentially mirror images of one another about a vertical plane longitudinally bisecting the soft recoil system 10. The illustrative embodiment of a soft recoil system 10 includes pair of elongate recoil cylinders 51, 61, which have longitudinal axes that are generally parallel to each other. The recoil cylinders 51, 61 are supported in a spaced-apart configuration by a crossover bracket 59 on the top side and a mounting bracket 57 on the bottom side. In one embodiment of a soft recoil system 10 when compared to the prior art, the soft recoil system 10 increases the window of velocities that may be successfully fired for a particular zone/charge, decreases the maximum velocity necessary to successfully fire the top charge (thereby reducing the misfire forces), and provides throttling capability over the entire stroke length (thereby reducing overload forces).

Each recoil cylinder 51, 61 may be hydro-pneumatically linked to an associated gas reservoir or recuperator 56, 66 through a fluid transfer manifold, wherein only fluid transfer manifold 65 for the second recoil cylinder 61 and recuperator 66 is shown in FIG. 3. A first and second rail guide 50, 60 may be affixed to opposed inner surfaces of the first and second recoil cylinders 51, 61, respectively. The rail guides 50, 60 may be configured to be respectively slideably engaged with the rails 28, 30 affixed to the barrel 20 as shown in FIG. 2. This allows the recoiling parts to move linearly with respect to the non-recoiling parts along the rails 28, 30 and rail guides 50, 60. The crossover bracket 59, which is designed to straddle the barrel 20, may include an underside surface configured to mate with the curved upper surface of the barrel 20.

In another embodiment of a soft recoil system 10, only a single recoil cylinder 61 and recuperator 66 are used. In this embodiment, the recoil cylinder 61 and recuperator 66 may be positioned parallel with respect to the barrel 20 of the gun 12 to which the soft recoil system 10 is cooperatively engaged. It is contemplated that in such an embodiment of a soft recoil system 10 it will be especially advantageous to position the recoil cylinder 61 and/or recuperator 66 either directly above or directly below the barrel 20 such that a vertical plan will bisect the barrel 20, recoil cylinder 61, and recuperator 66. However, other configurations and/or orientations may be used without limitation.

The soft recoil system 10 may include a pair of recoil rods 52, 62, which may be positioned within and extend from the forward ends of the recoil cylinders 51, 61. When the soft recoil system 10 is fitted onto the gun 12 of FIG. 1, the forward ends 53, 63 of the recoil rods 52, 62 are fitted into the apertures formed in the flanges 39 of the muzzle yoke 38. In the illustrative embodiment of the soft recoil system 10, the recoil rods are pneumatically/hydraulically driven, as described in detail below.

Figure 4:
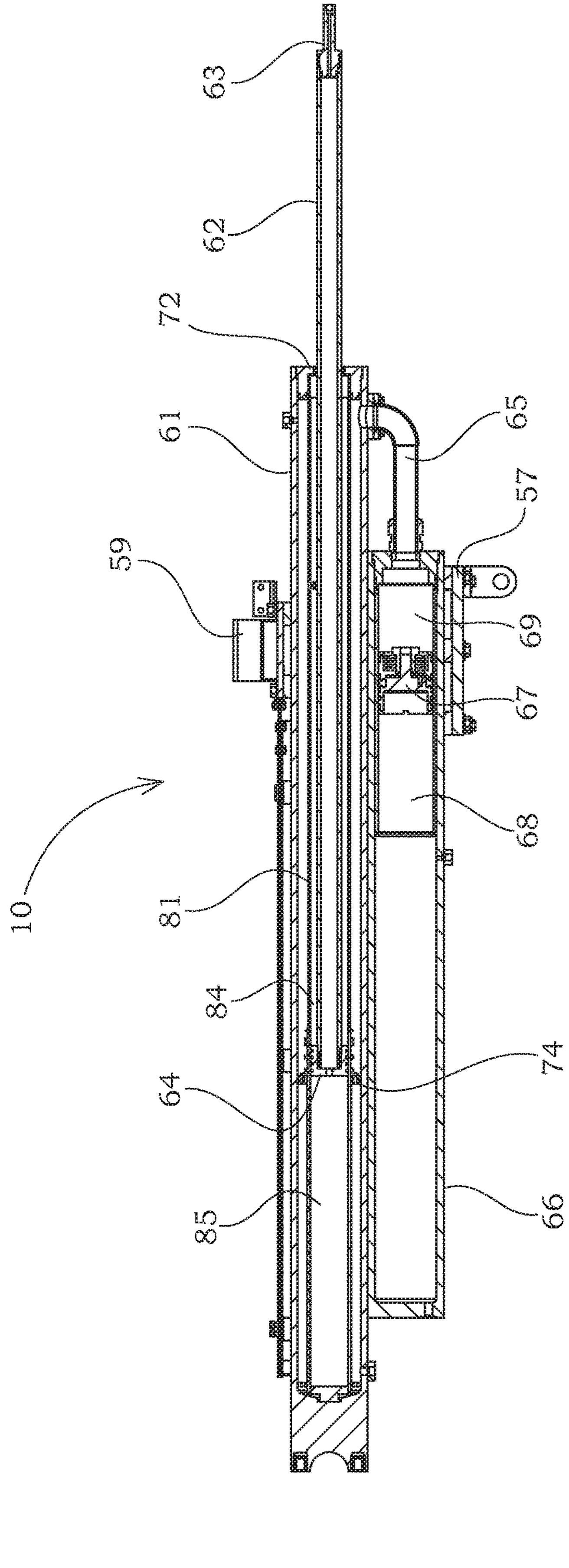
FIG. 4 is a cross-sectional view of the embodiment of a soft recoil system shown in FIG. 1 along a recoil cylinder.
Figure 5:
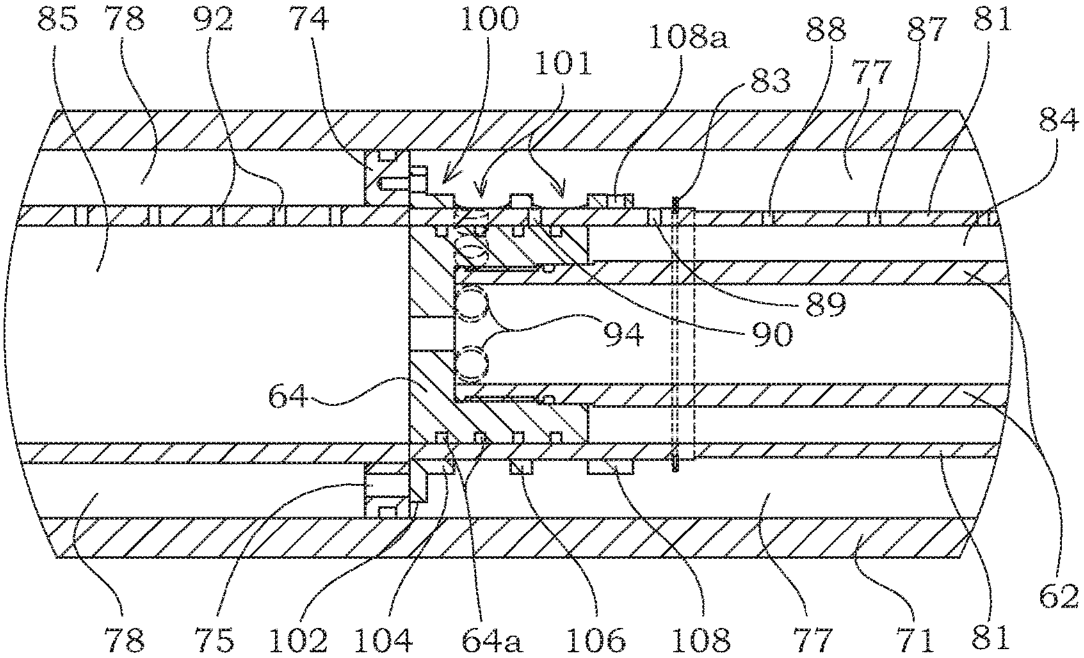
FIG. 5 is a detailed view of a portion of FIG. 4 adjacent the check valve.
Figure 6:
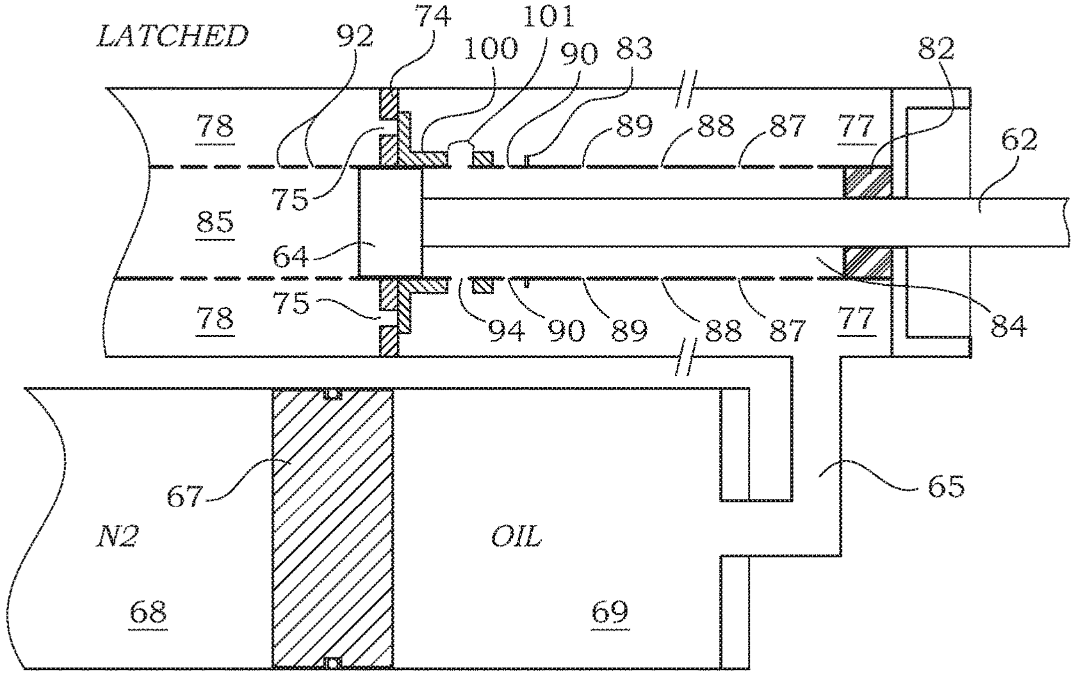
FIG. 6 is a cross-sectional schematic view of a recuperator and recoil cylinder showing the internal details of the embodiment of a soft recoil system shown in FIG. 1 when the gun is in the latched position.

FIG. 4 shows a cross-sectional view of the soft recoil system 10 along the longitudinal axis of the recuperators 56, 66 and recoil cylinders 51, 61. FIG. 5 provides a detailed cross-sectional view of a recoil cylinder 51, 61 in the area of the partition 74. Referring now to FIG. 6, which provides a schematic representation of the portion of a recoil cylinder 51, 61 shown in FIG. 5, a recuperator 56, 66, and a transfer manifold 65.

For brevity, the following description regarding the internal function, configuration, and/or components of the soft recoil system 10 depicted in FIGS. 6-10 will refer to the second recoil cylinder 61 and associated elements positioned on the corresponding side of the gun 12. However, it is to be understood that the general function, configuration, and/or components of the first recoil cylinder 51 and associated elements positioned on the corresponding side of the gun 12 is similar to that of the second recoil cylinder 61 and associated elements. In FIGS. 6-10, the arrows are meant to depict fluid flows at various phases of operation of one soft recoil system 10 in accordance with the present disclosure.

In FIG. 6, the second recoil cylinder 61 and the associated recoil rod 62 are in fluid communication with the fluid transfer manifold 65, which is in turn in fluid communication with the second recuperator 66. The recuperators 56, 66 in the illustrative embodiment of the soft recoil system 10 are formed with a floating piston 67 therein. The second recoil cylinder 61 may include an outer cylinder 71, a circular end seal 72, a circular partition 74, and a cylindrical inner cylinder 81 that is partially supported within the outer cylinder 71 by the end seal 72 and the partition 74. In the illustrative embodiment shown in FIGS. 1, 3, 4, & 5 the outer diameter of the inner cylinder 81 may be approximately 50% that of the outer diameter of the outer cylinder 71. However, in other embodiments of the soft recoil system 10 the relative sizes of the cylinders 71, 81 and the thicknesses of the walls thereof will vary without limitation depending on the specific embodiment of the soft recoil system 10.

Still referring to FIG. 6, a first or forward outer chamber 77 is defined by the outer and inner cylinders 71, 81 and the partition 74. A second or rearward outer chamber 77 is defined by the outer and inner cylinders 71, 81 and a partition 74, which is circular in the illustrative embodiment. The partition 74 includes ports 75 that allow fluid flow between forward and rear outer chambers 77, 78. A recoil piston 64, which may be cylindrical in shape, may be positioned within the inner cylinder 81 and moveable along the length of the inner cylinder. The recoil piston 64 may be connected to the rear end portion of the recoil rod 62.

A stuffing box 82, which may be configured to encircle the recoil rod 62, may be secured to the end seal 72 to form a fluid bearing and seal element for the reciprocating recoil rod 62. The recoil piston 64 separates the interior chamber defined by the inner cylinder 81 into a forward inner chamber 84 and rear inner chamber 85. The tolerances between the recoil piston 64 and the inner cylinder 81 are selected such that a predetermined amount of fluid flow or leakage may occur at the space or interface between the sidewalls of the recoil piston 64 and inner cylinder 81 under certain circumstances. It is contemplated that for most embodiments of the soft recoil system 10 any leakage between the recoil piston 64 and the inner cylinder 81 will be a relatively low volumetric amount compared to that of fluid flowing directly from the forward inner chamber 84 to the rear inner chamber 85 and vice-versa. As shown in FIG. 5, one embodiment of a recoil piston 64 is formed with a plurality of annular lubricant grooves **64*a* on the periphery thereof. These lubricant grooves 64*a* allow for a pressure differential across the length of the recoil piston 64 and provide a reservoir for oil to reduce friction between the recoil piston 64 and interior wall of the inner cylinder 81. The precise number, configuration, and/or orientation of the recoil piston 64 and/or lubricant grooves 64*a* will vary from one embodiment of the soft recoil system 10 to the next and are therefore in no way limited to the scope of the soft recoil system 10** as disclosed and claimed herein.

The inner cylinder 81 includes a plurality of fluid passages 87, 88, 89, and 90 (first, second, third, and fourth fluid passages, respectively) spaced along the length thereof on the forward or muzzle side of the partition 74. The inner cylinder 81 also includes a plurality of fluid passages 92 rearward of the partition 74. These fifth fluid passages 92 allow the transfer of fluid directly between the rear inner chamber 85 and rear outer chamber 78, which as shown in FIG. 6 are oriented to the left or rearward of the recoil piston 64 and partition 74.

Still in general reference to FIG. 6, the inner cylinder 81 also includes sixth fluid passages 94, which are larger than the fluid passages 87, 88, 89, 90 and 92. The fluid passages 94 are located near the partition 74 on the forward (i.e., to the right) side of the recoil cylinder 51, 61. A check valve 100 may be positioned to surround the inner cylinder 81 and may be configured to have a right-angle cross-section, a first embodiment of which is shown in cross-section in FIGS. 6-10. The check valve 100 may include a flange portion 102 for blocking aperture 75 in partition 74 when the check valve 100 is located in a first operative position. Check valve 100 may also include a sleeve portion 103 that surrounds the inner cylinder 81 for selectively obstructing fluid flow through the sixth fluid passage 94. In a first operative position shown in FIG. 6, the check valve fluid passages 101 in the sleeve portion 103 are in fluid communication with the sixth fluid passages 94 in the cylindrical inner sleeve 81. In a second operative position shown in FIG. 8B the check valve 100 moves to the right toward the front end of the recoil cylinder to engage stop element 83, thereby obstructing fourth and sixth fluid passages 90, 94 and not obstructing port 75 in partition 74.

Figure 5A:
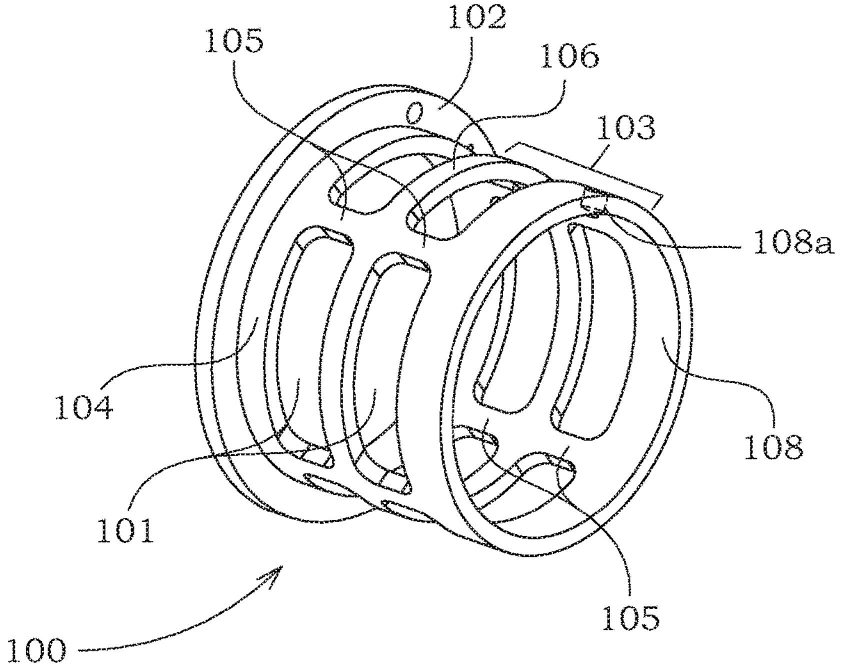
FIG. 5A is a detailed perspective view of one embodiment of a check valve that may be used with a soft recoil system.
Figure 11A:
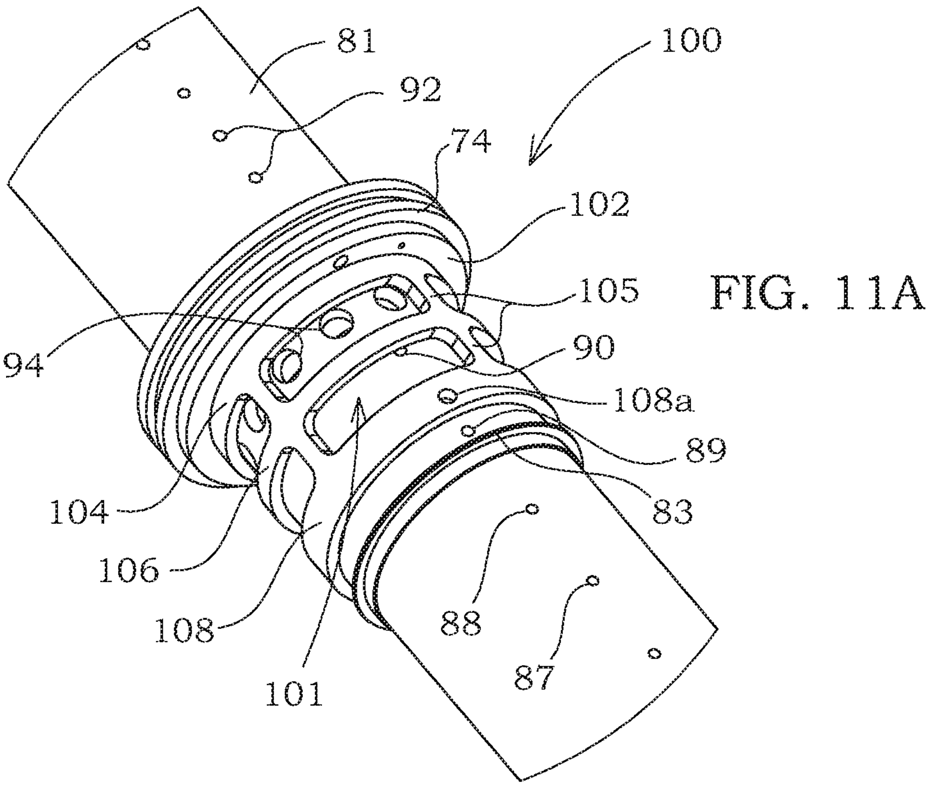
FIG. 11A is a perspective view of the embodiment of a check valve shown in FIG. 5A, wherein the check valve is shown relative to a portion of the inner cylinder, and wherein the check valve is positioned to abut the stop partition.
Figure 11B:
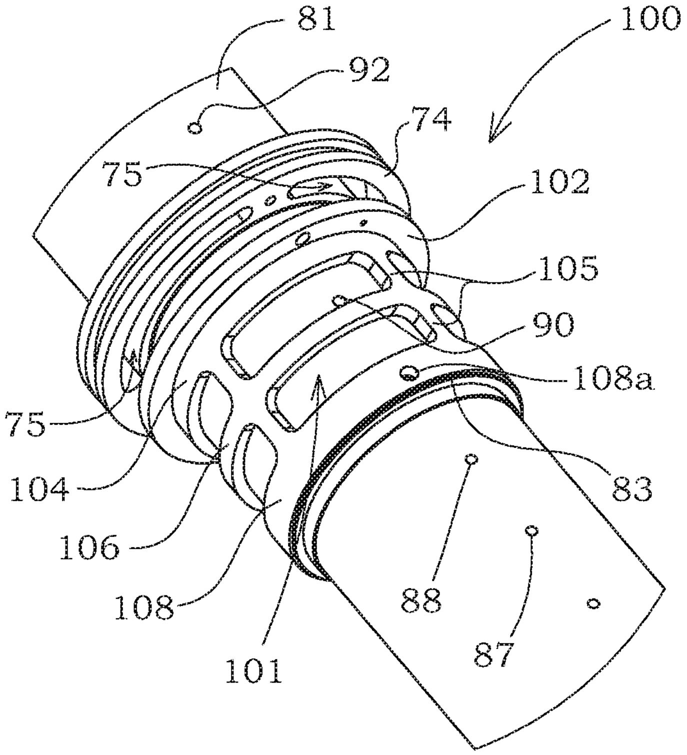
FIG. 11B is a perspective view of the embodiment of a check valve shown in FIG. 5A, wherein the check valve is shown relative to a portion of the inner cylinder, and wherein the check valve is positioned to abut the stop element.

FIG. 5A shows a perspective view of a second embodiment of a check valve 100, and FIG. 5 provides a cross-sectional view thereof in relation to the partition 74 and adjacent elements of the recoil cylinder 51, 61. The second embodiment of a check valve 100 in a position such that it abuts partition 74 is shown in FIG. 11A, and such that it abuts the stop element 83 is shown in FIG. 11B. The second embodiment of a check valve 100 includes a flange portion 102 and a sleeve portion 103. The sleeve portion 103 comprises a first collar portion 104 joined 104 to the flange portion 102. Circumferentially spaced finger portions 105 project from the first collar portion 104 and extend to a peripheral collar portion 108, wherein an intermediate collar portion 106 is positioned between the first and peripheral collar portions 104, 108, all of which collar portions 104, 106, 108 may be joined to the finger portions 105. The first collar portion 104, finger portions 105, and intermediate and peripheral collar portions 108 define check valve fluid passages 101 therebetween.

Figure 8A:
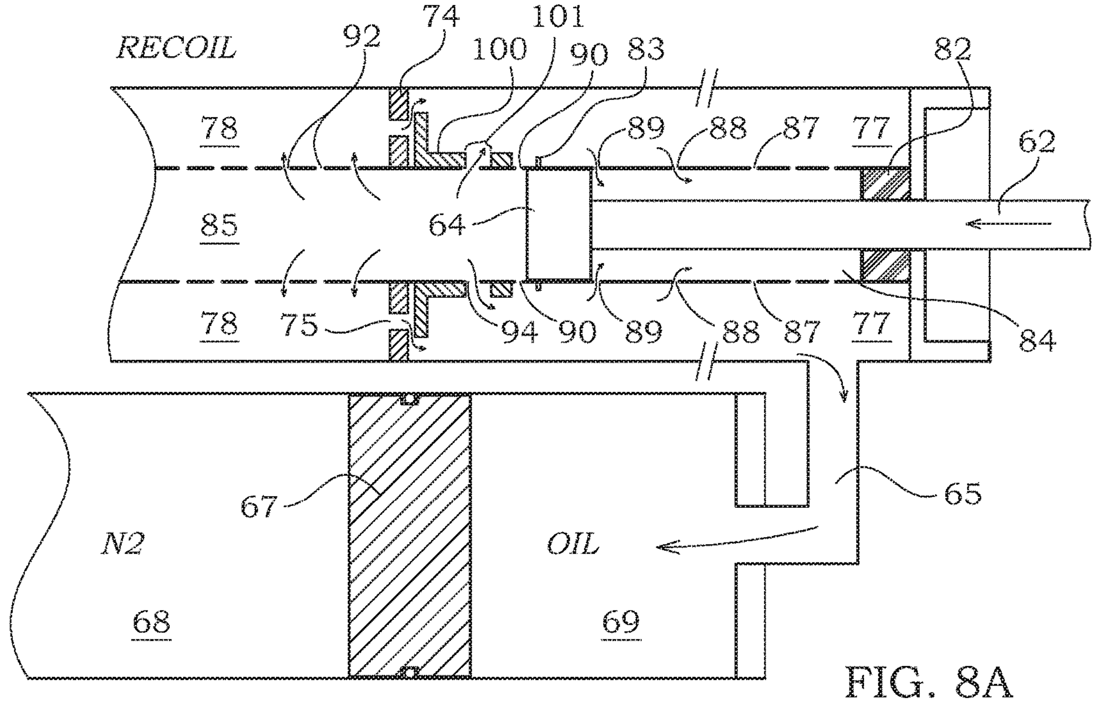
FIG. 8A is a cross-sectional schematic view of the recuperator and recoil cylinder of FIG. 6 when the gun is in the beginning of the recoil phase.
Figure 8B:
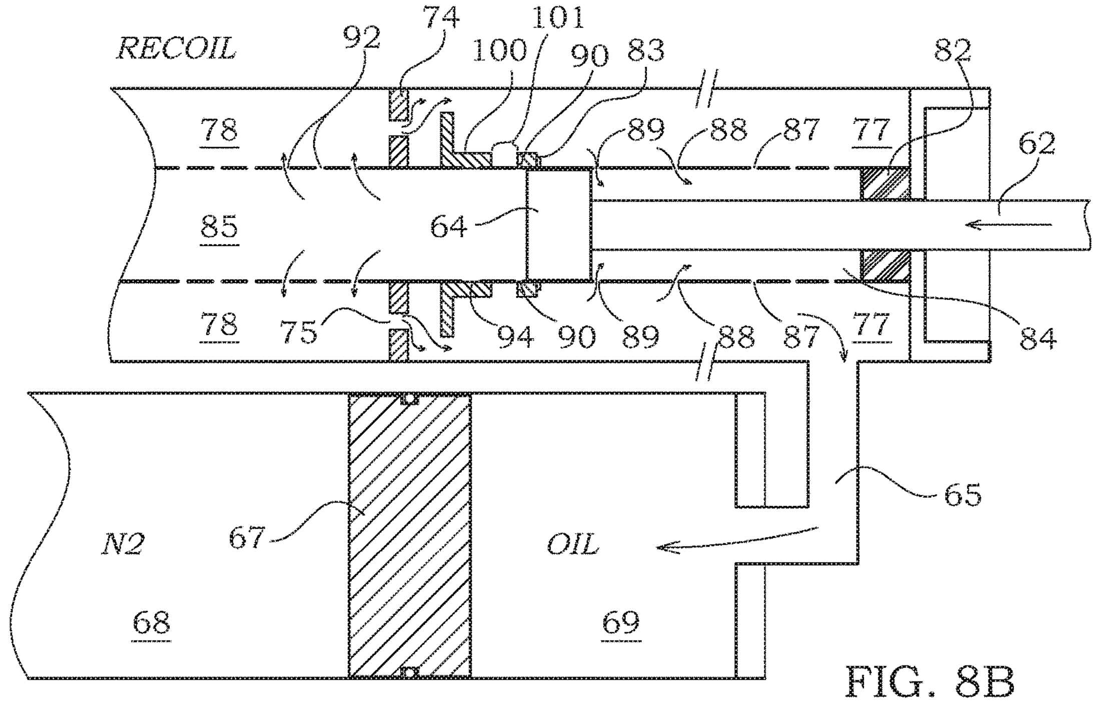
FIG. 8B is a cross-sectional schematic view of the recuperator and recoil cylinder of FIG. 6 when the gun is in the recoil phase.

The width of the collar portions 104, 106, 108 and length of the finger portions 105 may be selected so that the sixth fluid passages 94 in the inner cylinder 81 will be exposed when the check valve 100 is in a first operative position (as shown in FIG. 6 for the first embodiment of a check valve 100), partially exposed when in an intermediate operative position (as shown in FIG. 8A for the first embodiment of a check valve 100), and fully obstructed when in a second operative position (as shown in FIG. 8B, wherein the distal end of the sleeve portion 103 abuts the stop element 83) for the first embodiment of a check valve 100.

In the second embodiment of a check valve 100, the peripheral collar portion 108 may include a relief fluid passage 108*a*. In the illustrative embodiment of the soft recoil system 10, when the second embodiment of a check valve 100 is in the second operative position, the relief fluid passage 108*a* is aligned with the third fluid passage 89 (see FIG. 5) and a check valve fluid passage 101 is aligned with the fourth fluid passage 90. This configuration allows the third and fourth fluid passages 89, 90 to be available for fluid throttling even when the check valve 100 is in the second operative position (i.e., the position shown in FIG. 8B). Other embodiments of the soft recoil system 10 will require check valves 100 configured differently than the embodiments thereof pictured and described herein. Accordingly, the specific configuration, orientation, and/or function of the check valve 100 in no way limits the scope of the soft recoil system 10 as disclosed and claim herein.

As shown in FIGS. 6-10, the recuperator 66 in the illustrative embodiment of the soft recoil system 10 comprises an elongate hollow cylinder containing a floating piston 67 that divides the cylinder into separate first and second recuperator chambers 68, 69. Liquid, vapor, or gas may be positioned in either recuperator chamber 68, 69. It is contemplated that the first recuperator chamber 68 will be filled with nitrogen or another compressible gas capable of acting as a fluid spring in conjunction with the floating piston 67. It is also contemplated that the second recuperator chamber 69 will be filled with an inert oil of sufficient lubriciousness for the particular embodiment of the soft recoil system 10. The second recuperator chamber is in fluid communication with the fluid transfer manifold 65 and forward outer chamber 77. The fluid in the recoil cylinder 61, first recuperator chamber 68, and/or second recuperator chamber 69 may serve as an energy storage and/or transfer media.

FIGS. 6-10 show different operative steps (sometimes referred to herein as "phases") in the firing of a gun 12 outfitted with the illustrative embodiment of the soft recoil system 10. The "latched position" of FIG. 6 shows the position of the second recoil rod 62 and second recoil piston 64 relative to inner cylinder 81 and the partition 74. Since both recoil rods 52, 62 move together in unison or mirror each other in the illustrative embodiment of the soft recoil system 10 as previously described, the movement of the recoil rods 52, 62 will be explained in terms of the second recoil rod 62. The recoiling parts of the soft recoil system 10 are held in this "equilibrium" or "in battery" position by a latch mechanism 200, partially shown in FIG. 1, until the gun 12 is ready for firing.

Figure 7:
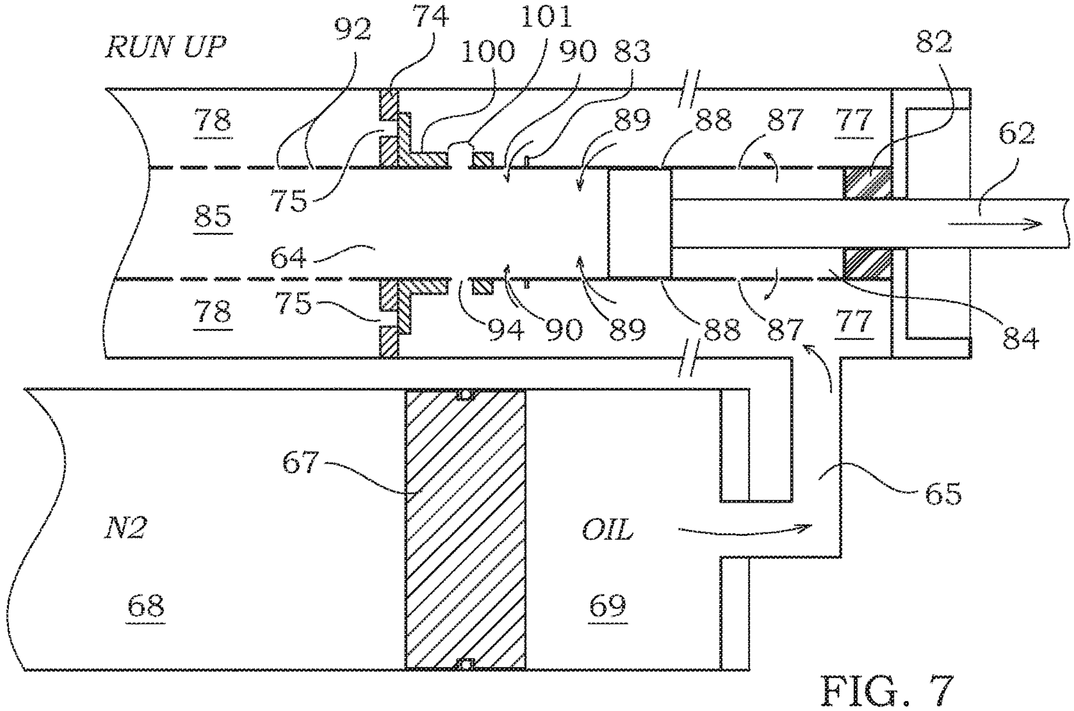
FIG. 7 is a cross-sectional schematic view of the recuperator and recoil cylinder of FIG. 6 when the gun is in the run-up phase.

When the external latch mechanism 200 is released, the unbalanced force of the gas pressure in fluid chamber 68 acts upon the floating piston 67 to move the floating piston 67 to the right and to force the fluid out of chamber 69 and into the first or forward outer chamber 77, as generally depicted in FIG. 7. The pressurized fluid then begins to flow into the forward inner chamber 84 through the fluid passages 87, 88, 89, 90, and 94. Additionally, leakage may occur between the recoil piston 64 and the walls of the inner cylinder 81 such that a certain amount of fluid passes directly from forward inner chamber 84 to rear inner chamber 85. However, as previously described, it is contemplated that in most embodiments of the soft recoil system 10 this leakage will be relatively small compared to the fluid flow through passages 87, 88, 89, 90, and 94. This same action occurs simultaneously in the first recoil cylinder 51.

As a result of this leakage and the force differential on the opposite axial surfaces of the recoil piston 64, the recoil piston 64 and the recoil rod 62 are caused to move to the right with respect to the recoil cylinder 61, as shown in FIG. 7. The force differential is a result of the area differential between the front and back axial surfaces of the recoil piston 64. Because the muzzle yoke 38 is connected to the recoil rods 52 and 62, the attached recoiling parts are also accelerated forward (i.e., to the right in FIG. 7). As the recoil piston 64 continues to move to the right in FIG. 7, it passes sixth and fourth fluid passages 94, 90 so that fluid in forward outer chamber 77 can now flow directly into the expanding rear inner chamber 85 through the sixth and fourth fluid passages 94, 90. Partition passage 75 is kept closed by check valve 100 during this forward acceleration phase or "run-up" phase. The sixth fluid passages 94, which are located just to the rear of the fourth fluid passages 90, may be sized to minimize pressure drops from forward outer chamber 77 to rear inner chamber 85 during the run-up phase.

The "recoil" phase (shown at the beginning of the phase in FIG. 8A and later in the phase in FIG. 8B) begins with the firing of the cartridge during the "run-up" phase. The firing of the cartridge actually occurs at a predetermined position forward of the "latched" or "in battery" position. Part of the energy of the cartridge stops the forward acceleration/momentum of the recoiling parts of the soft recoil system 10 and the remaining energy of the cartridge forces the recoiling parts to begin to accelerate rearward or to recoil. With the recoil phase of FIGS. 8A & 8B, recoil rod 62 and recoil piston 64 are forced back into the inner cylindrical 81 (i.e., to the left). As a result, the fluid inside rear inner chamber 85 is forced out of the rear inner chamber 85 through fluid passages 90, 94, and 92. These fluid passages 90, 94, and 92 function as throttling orifices wherein the throttling area decreases as the recoil piston 64 moves further and further into the inner cylinder 81, (i.e., to the right in FIGS. 8A & 8B). It is this net force acting on recoil piston 64 that helps to slow and eventually stop the rearward movement of the recoiling parts. While fluid flows through fluid passages 90, 94, and 92 the portion flowing out of apertures 92 and into the rear outer chamber 78 causes the pressure in the rear outer chamber 78 to increase until it exceeds the pressure in the forward outer chamber 77. At this point, fluid pressure differentials on check valve 100 cause it to move forward (the start of which is shown in FIG. 8A), thereby opening port 75 so that fluid is allowed to flow from the rear outer chamber 78 directly to the forward outer chamber 77 through passage 75 (as shown in FIG. 8B, wherein the check valve 100 abuts the stop element).

When the check valve 100 does move (i.e., to the right in FIGS. 8A & 8B), it effectively closes off sixth fluid passages 94, thus allowing fluid to flow out of the inner cylinder 81 only through the fourth and fifth fluid passages 90, 92 to the rear of recoil piston 64. The rising pressure causes the fluid displaced by recoil piston 64 to flow back through the transfer manifold 65 into the recuperator 66 where it acts upon the floating piston 67 to recompresses the fluid in the first recuperator chamber 68. This process continues until all the energy of recoil has been absorbed. When this occurs, recoil piston 64 will be to the left or rear of the partition 74, as shown in FIG. 9.

Figure 12:
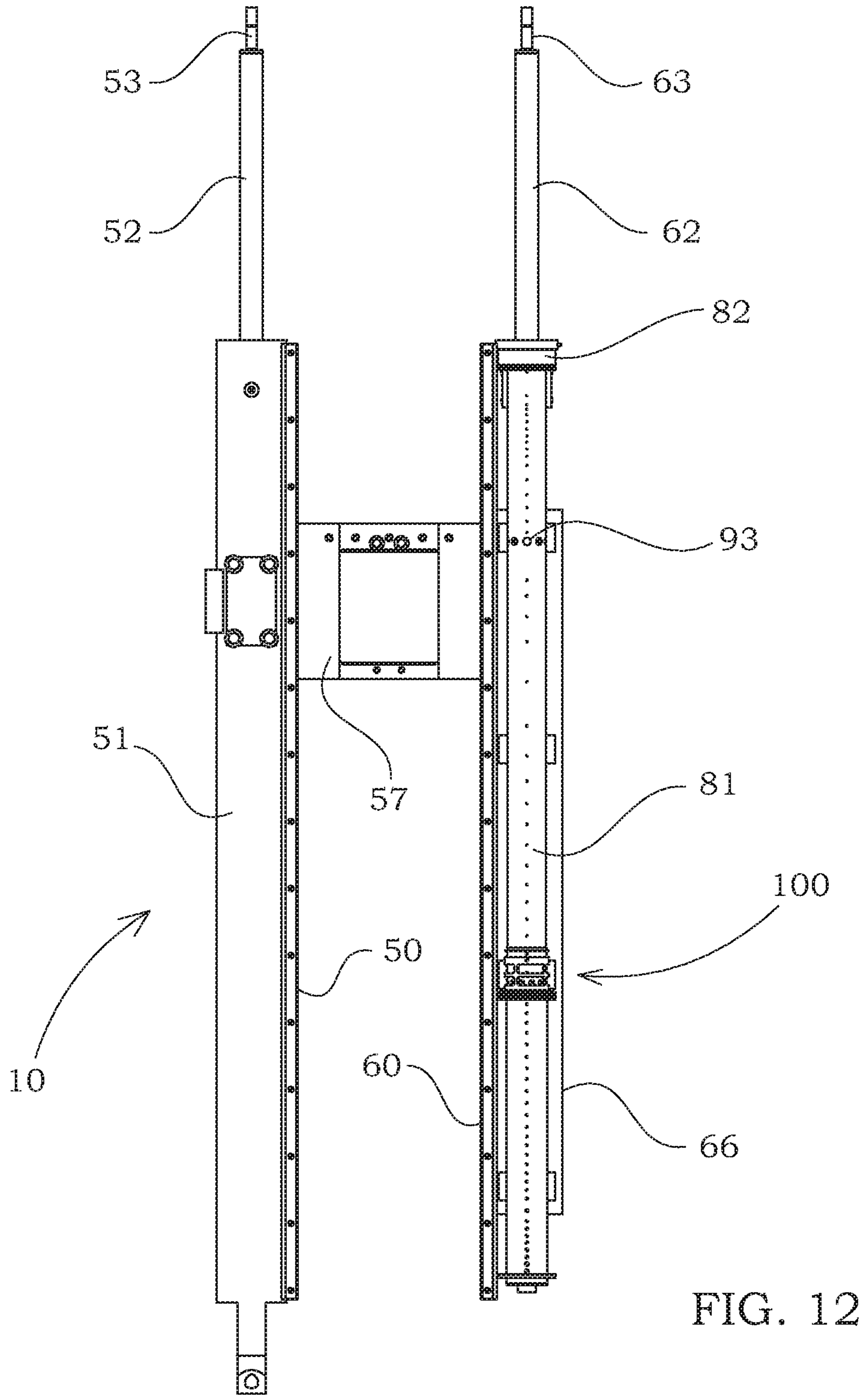
FIG. 12 is a top view of the illustrative embodiment of a soft recoil system wherein one of the outer cylinders of a recoil cylinder has been removed to show one configuration of an inner cylinder and various fluid passages.

The sixth fluid passage 94 may be sized to provide sufficient flow area so that the velocity of the recoiling parts during the run-up phase is only slightly affected by the pressure drop across the sixth fluid passage 94. As shown in FIG. 12 (which provides a top view of a first embodiment of an inner cylinder 81), it is contemplated that for the illustrative embodiment of the soft recoil system 10, the sixth fluid passage 94 will have a larger cross-sectional area than the fluid passages 87, 88, 89, 90, and 92. It may also be sized and positioned so that check valve 100 may open and close the sixth fluid passage 94 when the check valve 100 slides rearward and forward along the inner cylinder 81, respectively. Furthermore, although only seven fluid passages 87, 88, 89, 90, 92, 93, and 94 are called out and discussed for purposes of clarity and brevity, as is clear from FIG. 12 the inner cylinder may include more than seven fluid passages 87, 88, 89, 90, 92, 93, and 94. Additionally, the various fluid passages 87, 88, 89, 90, 92, 93, and 94 may have different or the same cross-sectional areas as adjacent and/or non-adjacent fluid passages 87, 88, 89, 90, 92, 93, and 94. Accordingly, the configuration, orientation, and/or specific function of the fluid passages 87, 88, 89, 90, 92, 93, and 94 shown herein is in no way limiting to the scope of the soft recoil system 10 as disclosed and claimed herein.

Port 75 may be sized to provide sufficient cross-sectional area for fluid flow through partition 74 so that fluid flowing from the rear outer chamber 78 to the forward outer chamber 77 may pass through the partition 74 with minimal pressure drop when check valve 100 is pushed away from the partition 74. Port 75 may also be positioned and sized so that it may be closed to fluid flow when the check valve 100 is in its rearward position (i.e., abutting the partition 74).

Figure 9:
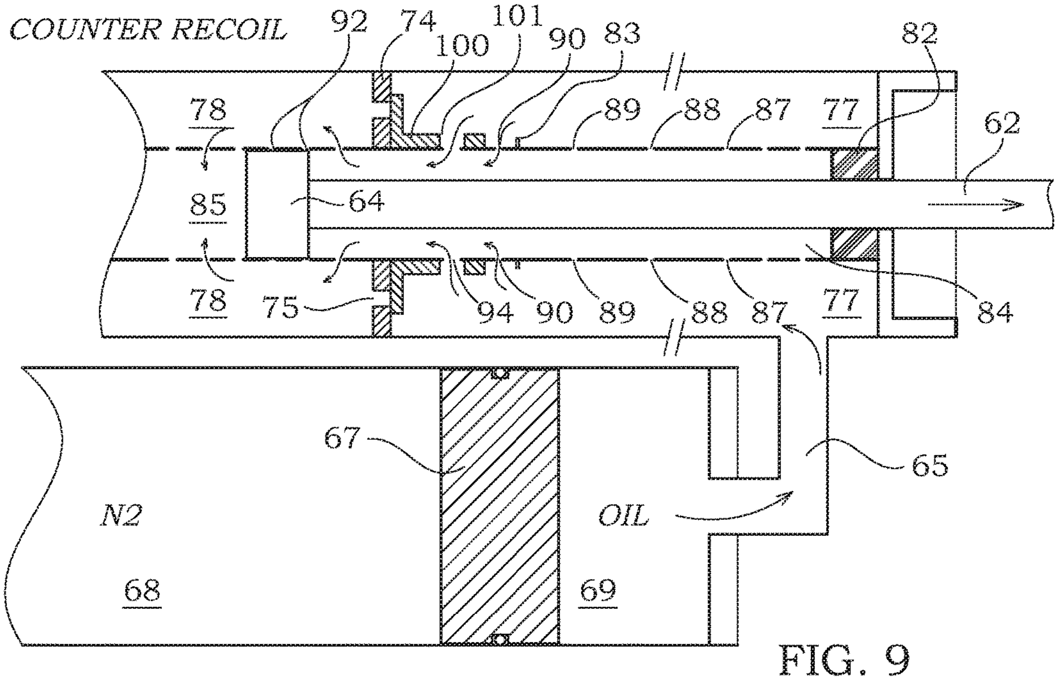
FIG. 9 is a cross-sectional schematic view of the recuperator and recoil cylinder of FIG. 6 when the gun is in the counter-recoil phase.

The "counter-recoil" phase, which is depicted schematically in FIG. 9, begins when the increasing gas pressure in the first recuperator chamber 68 stops further movement of the floating piston 67. At this point the gas pressure in the first recuperator chamber 68 begins to force fluid out of the second recuperator chamber 69 through the transfer manifold 65 into the forward outer chamber 77 (as happens during the run-up phase). As this fluid flow continues, a pressure difference develops between the forward outer chamber 77 and the rear outer chamber 78 that causes the check valve 100 to move rearward and close off port 75. The resultant force acting on the recoil piston 64 eventually causes the recoil piston 64 and recoil rod 62 to move forward (i.e., to the right). With port 75 closed to fluid flow, the fluid flows from the forward outer chamber 77 into the forward inner chamber 84 through fluid passages 87, 88, 89, and 90. The fluid may then flow from the forward inner chamber 84 through fifth fluid passages 92 into the rear outer chamber 78, and from the rear outer chamber 78 to the rear inner chamber 85, as best shown in FIG. 9.

The greater surface area on the rear axial surface of the recoil piston 64 compared to the front axial surface thereof and the fluid flow into the rear inner chamber 85 causes the recoil piston 64 to move forward, (i.e., to the right). As the recoil piston 64 moves forward in the inner cylinder 81, the gas pressure in the first recuperator chamber 68 begins to drop. Also, as the forward edge of recoil piston 64 reaches the position of the partition 74, the resulting pressure differential and the velocity of the recoiling parts may be controlled by the leakage of fluid at the interface between the recoil piston 64 and the inner cylinder 81, by the position of fluid passages 92 with respect to adjacent fluid passages 92 and the partition 74, and/or through a combination thereof. The resulting reduced velocity of the recoiling parts continues until the recoiling parts reach and make contact with the external latch 200 (i.e., when the recoil piston 64 is adjacent the partition 74). This completes a cycle.

Figure 10:
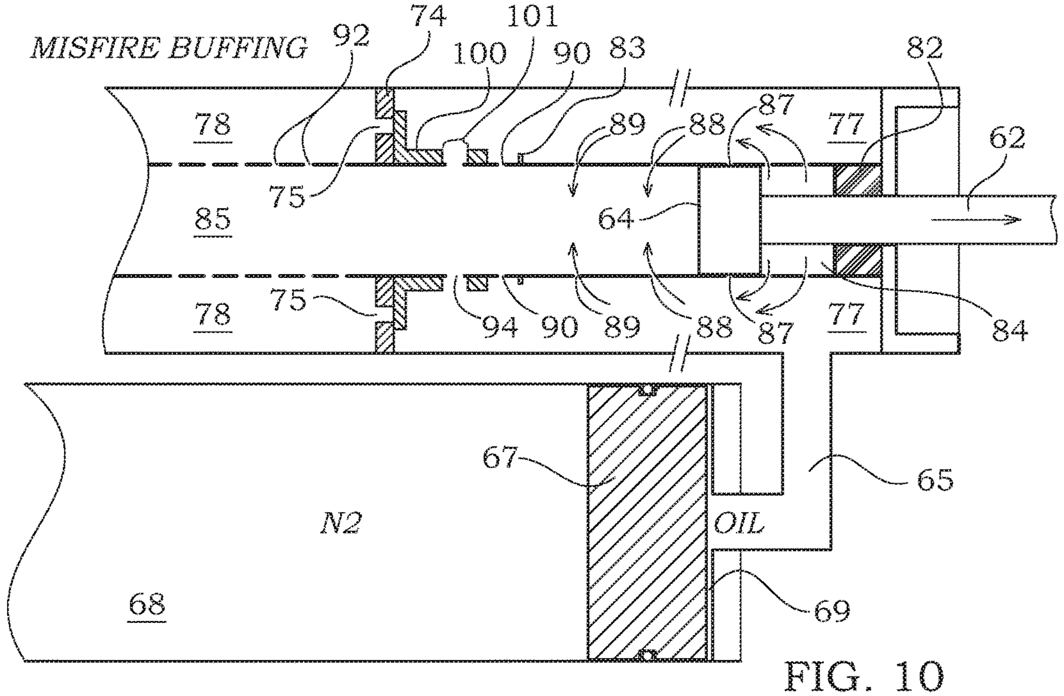
FIG. 10 is a cross-sectional schematic view of the recuperator and recoil cylinder of FIG. 6 when the gun is in the misfire buffing phase.

A "misfire buffing" phase may be provided in the event that the round fails to fire during the run-up phase, as depicted in FIG. 10. The energy or momentum contained in the recoiling parts must be dissipated in a controlled manner to prevent possible damage or unwanted weapon instability. This "misfire buffing" process may be completed internally using the interface of recoil piston 64, recoil rod 62, inner cylinder 81, and fluid passages 87, 88, 89 and 90 to provide the necessary buffing via fluid throttling. At a point when the recoil piston 64 has moved to a position just short of the third fluid passage 89, continued movement results in the recoil piston 64 crossing passage 88. At this point fluid inside of forward inner chamber 84 is pressurized due to the restricted flow path provided by the first fluid passage 87 (i.e., the only path fluid within the forward inner chamber 84 may take to flow into the forward outer chamber 77). The resulting increase in the pressure in the forward inner chamber 84 causes the velocity of the recoiling parts to slow. The second fluid passages 88 may be positioned just to the rear of the misfire buffing section of inner cylinder 81 and may be sized to provide sufficient cross-sectional area to allow for the free flow of fluid out of cylinder 81 during the run-up phase of operation.

While FIGS. 6-10 provide simplified, schematic depictions of the internal workings of one embodiment of a soft recoil system 10, FIG. 4 provides a cross-sectional view of a field-ready implementation of the principals from FIGS. 6-10. FIG. 5 provides a cross-sectional view about the check valve 100 with the recoil piston in the latched phase of the field-ready implementation. In light of the description related to FIGS. 6-10 contained herein, it will be apparent to those of ordinary skill in the art how the principals described with respect to FIGS. 6-10 correlate to the embodiment of a soft recoil system 10 shown in FIGS. 1, 3, 4, 5, and 11-13.

It is contemplated that the general orientation, elevation, and/or azimuth of the gun 12 may have an active control via a PLC and various sensors, wherein the PLC controls a translator of some sort (e.g., base 14, actuator 16, and/or a combination thereof). In an active control situation, the PLC would analyze data from the various sensors and output commands to the translator, which translator would adjust the orientation, elevation, and/or azimuth of the gun 12 accordingly.

The various fluid passages 87, 88, 89, 90, 92, 93, and 94, outer cylinder 71, inner cylinder 81, ports 75, and the partition 74 are configured such that the force of the spending the round is distributed over a longer distance of the soft recoil system 10 than that of prior art recoil systems. Additionally, the time over which the force is distributed is longer using the soft recoil system 10 than that of the prior art. One profile of the various fluid passages 87, 88, 89, 90, 92, 93, and 94 and their respective spacing and areas for an inner cylinder 81 are shown in FIG. 12. In the orientation shown in FIG. 12 the breech is positioned toward the bottom of the figure. Using principles of fluid mechanics for turbulent incompressible fluid flow (which may be accomplished via Bernoulli's equation in various forms) and equations of motion, one may calculate the appropriate values (e.g., fluid passage size, pressure differential, etc.) for a given system. The specific profile, configuration, and/or orientation of the fluid passages 87, 88, 89, 90, 92, 93, and 94 will vary from one embodiment of the soft recoil system 10 to the next. Accordingly, those variables are in no way limiting to the scope of the soft recoil system 10 as disclosed and claimed herein.

As is apparent from FIG. 12, it is contemplated that the majority of the fluid passages 87, 88, 89, 90, 92, and 93 may be positioned along the top of the inner cylinder 81 (i.e., at the 12 o'clock position) for the illustrative embodiment of the soft recoil system 10. This configuration allows the bottom surface of the recoil piston 64 to have a smooth surface on which to travel. As shown, the sixth fluid passages 94 and larger fluid passages 93 may be circumferentially distributed around the periphery of the inner cylinder 81. However, any of the fluid passages 87, 88, 89, 90, 92, 93, or 94 may be positioned at any circumferential position around the inner cylinder 81 without limitation. For certain applications it may be especially important to ensure a lubricant layer exists between the exterior of the recoil piston 64 and the interior of the inner cylinder 81 during the recoil phase to minimize any wear caused by shearing forces. Lubricant grooves **64*a* as shown in FIG. 5** may be especially helpful for such situations.

Figure 13A:
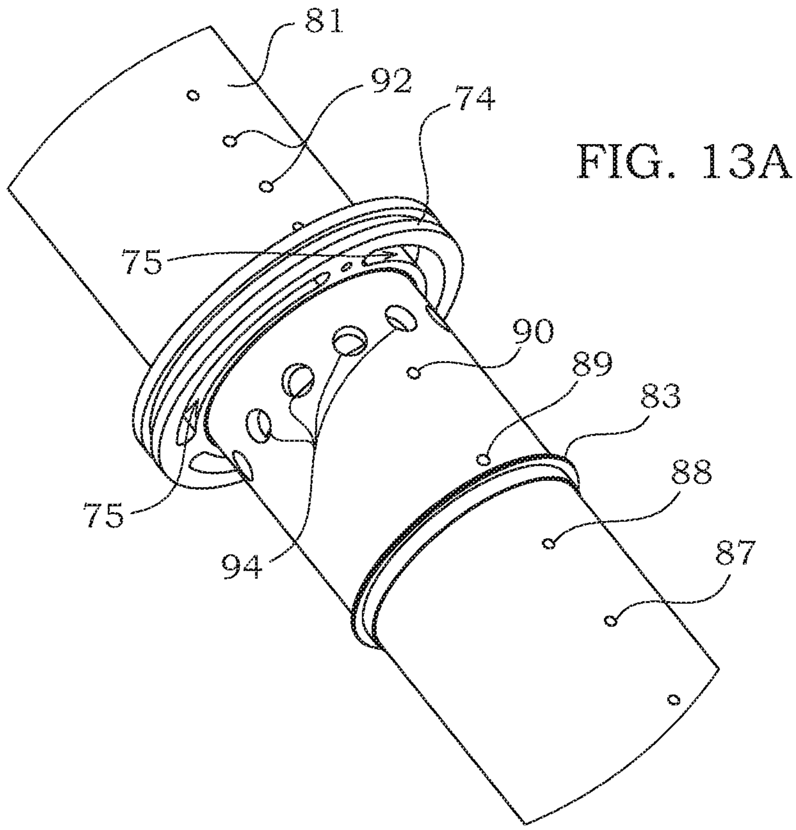
FIG. 13A is a detailed view of the illustrative embodiment of the soft recoil system at one recoil cylinder adjacent the partition wherein the outer cylinder and check valve have been removed.
Figure 13B:
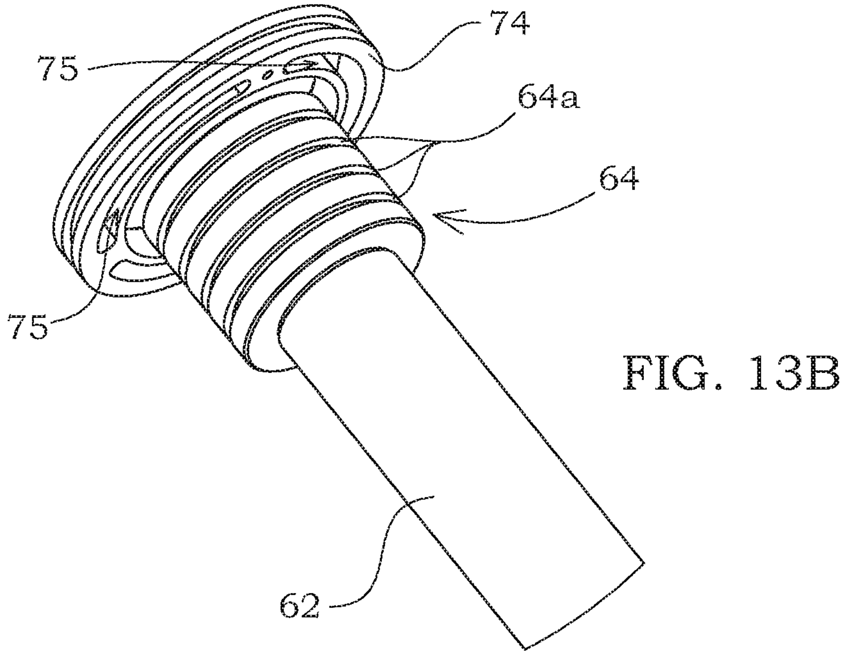
FIG. 13B is a detailed view of the illustrative embodiment of the soft recoil system at one recoil cylinder adjacent the partition wherein the outer cylinder, check valve, and inner cylinder have been removed.

FIGS. 13A-13B provide detailed views of the area of a recoil cylinder 51, 61 from the first embodiment of a soft recoil system 10 adjacent the partition 74 at various radial positions. In FIGS. 13A-13B, the soft recoil system 10 is oriented so that for a gun 12 engaged with the soft recoil system 10, the muzzle yoke 38 would be toward the right side of the figures and the breech 24 would be toward the left side of the figures. In FIG. 13A, the check valve 100 has been removed so that port 75 in the partition 74 is clearly visible. In FIG. 13B, the inner cylinder 81 has been removed so that the recoil rod 52, 62 and recoil piston 64 are clearly visible.

In the embodiment of a soft recoil system 10 shown in FIG. 12, the recoil piston 64 generally travels the length of the inner cylinder 81 between the partition 74 and the larger fluid passage 93 during the "run-up" phase. It is contemplated that this length may be approximately 25 inches, but this distance is in no way limiting to the scope of the soft recoil system 10 as disclosed and claimed herein, and will vary from one embodiment thereof to the next. Once the recoil piston 64 crosses the larger fluid passage 93 and the gun 12 has not yet fired, the soft recoil system 10 is placed in the misfire buffing phase, which is shown schematically in FIG. 10.

A "coast" length may be engineered into the inner cylinder 81 so that the recoil piston 64 may be in a window of approximately five inches in length (for the illustrative embodiment of the soft recoil system 10, but which length will vary from one embodiment of the soft recoil system 10 to the next) along the inner cylinder 81 behind (i.e., toward the breech 24) of larger fluid passages 93. If the recoil piston 64 is positioned in at a point in the coast length, the gun 12 may fire and the soft recoil system 10 will perform as designed. In the illustrative embodiment of the soft recoil system 10, the coast length is substantially located in an area between the larger fluid passage 93 and a point five inches rearward therefrom (i.e., toward the breech 24). However, in other embodiments of the soft recoil system 10 the coast length may be differently positioned along the inner cylinder 81, and/or the coast length may be longer or shorter than that shown herein. The embodiment shown in FIG. 12 generally allows the recoiling parts to accelerate during the entire run-up phase, although the acceleration may decrease as the recoil piston 64 approaches the coast length. The fluid passages 87, 88, 89, 90, and 92 positioned on the top side (i.e., 12 o'clock position) of the inner cylinder 81 most often function to throttle fluid exiting the interior cylinder 81, though at certain times fluid may enter the interior cylinder 81 via those fluid passages 87, 88, 89, 90, and 92.

Figure 15A:
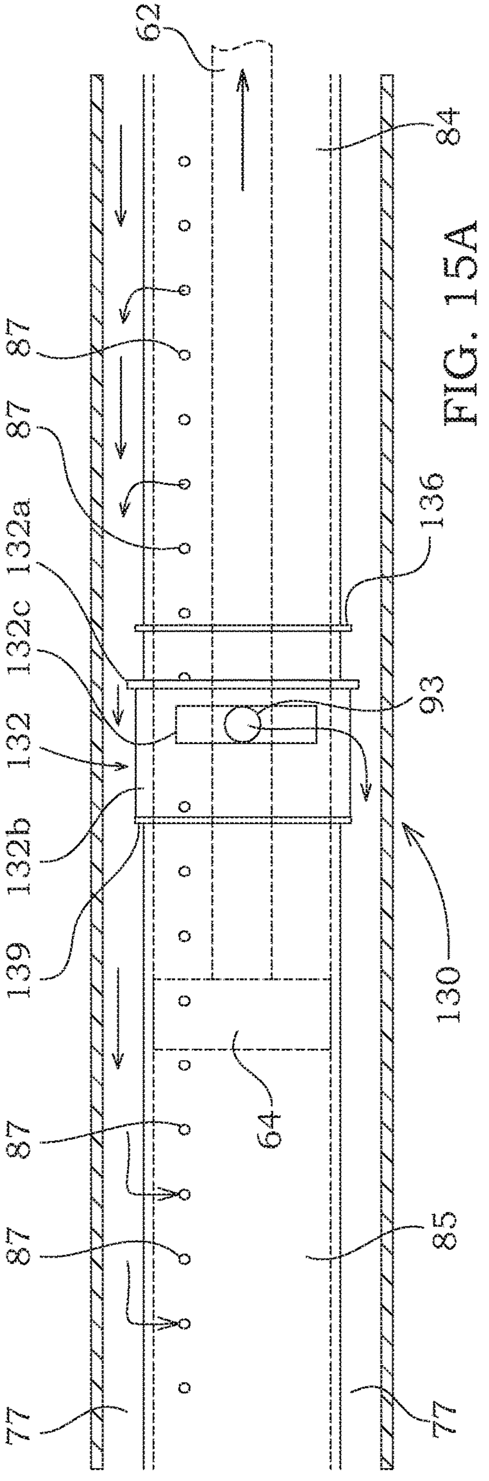
FIG. 15A is a longitudinal cross-sectional view of one embodiment of misfire recovery system during the misfire buffering phase, which misfire recovery system may be used with the soft recoil system.
Figure 15B:
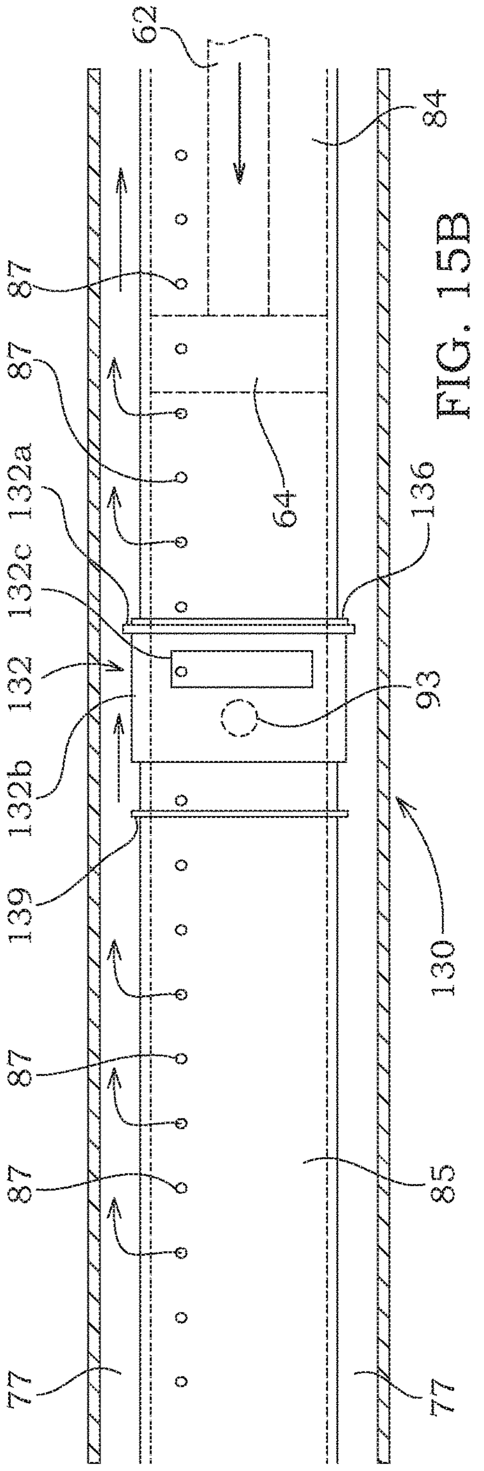
FIG. 15B is another cross-sectional view of the embodiment of a misfire recovery system shown in FIG. 15A during the recoil phase.

One embodiment of a misfire recovery system 130 is shown in FIGS. 15A and 15B. As shown, the misfire recovery system 130 allows a gun 12 engaged with the soft recoil system 10 to be fired in the event of a misfire, without the need to reposition the recoiling parts to the latch position. The misfire recovery system 130 comprises a misfire valve 132 slideably positioned around the exterior of a portion of the inner cylinder 81. The misfire valve 132 may be slideable between a first barrier 134 and a second barrier 136. The misfire valve 132 may include a misfire valve flange **132*a* and a misfire valve sleeve 132*b* projecting from the misfire valve flange 132*a*. The misfire valve sleeve 132*b* may be formed with a plurality of misfire valve fluid passages 132*c* therein, as shown in FIGS. 15A & 15B**.

During the run-up phase, the misfire valve 132 would typically be positioned as shown in FIG. 15A, wherein the misfire valve sleeve **132*b* abuts the first barrier 134. In this position, the misfire recovery system 130 generally does not affect the operation of the soft recoil system 10. That is, the misfire valve 132 does not impede fluid flow between the inner and outer cylinders 81, 71 during normal operation of the gun 12. As shown in FIG. 15A, the misfire valve 132 is positioned such that the larger fluid passage 93 are unrestricted during the run-up phase such that fluid may freely flow through the larger fluid passages 93 from the inner cylinder 81 to the outer cylinder 71**.

However, in the event of misfire, which situation is depicted in FIG. 15B (i.e., the recoil piston 64 has traveled past the large fluid passages in the direction toward the muzzle yoke 38), the misfire recovery system 130 allows the user to fire the gun 12 even though all the recoiling parts may be positioned near their forward-most allowable position. When the gun 12 is fired from such a position, the misfire valve 132 slides forward due to the greater force imparter to the rear (i.e., breech side) of the misfire valve 132 such that the misfire valve flange **132*a* abuts the second barrier 136 (as shown in FIG. 15B). The force differential is a result in the greater surface area on the rear side of the misfire valve 132** than on the front side thereof. When the misfire valve

132 moves forward, it blocks the larger fluid passages 93 so that fluid may only flow from the inner cylinder 81 to the outer cylinder 71 via the smaller fluid passages 87, 88, 89, and 90. Accordingly, the energy of the expenditure of the round is transferred to the fluid and dissipated through the throttled pumping of the fluid from the inner cylinder 81 to the outer cylinder 71 via fluid passages 87, 88, 89, and 90. That is, the misfire recovery system 130 allows a soft recoil system 10 to perform like a traditional recoil dissipating system even in the event of misfire, with no additional movement of the recoiling parts required to fire the gun 12 in the event of misfire.

Figure 16A:
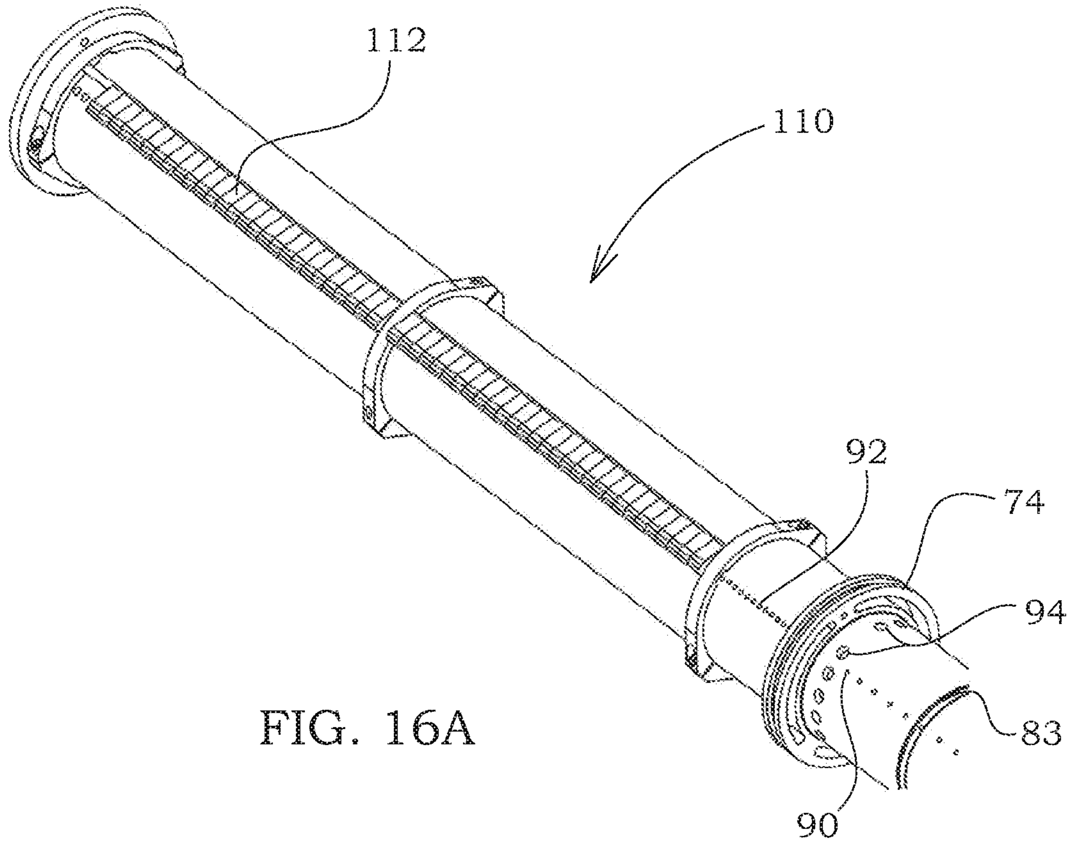
FIG. 16A is a perspective view of one embodiment of an inner cylinder outfitted with one embodiment of a counter-recoil control system.
Figure 16B:
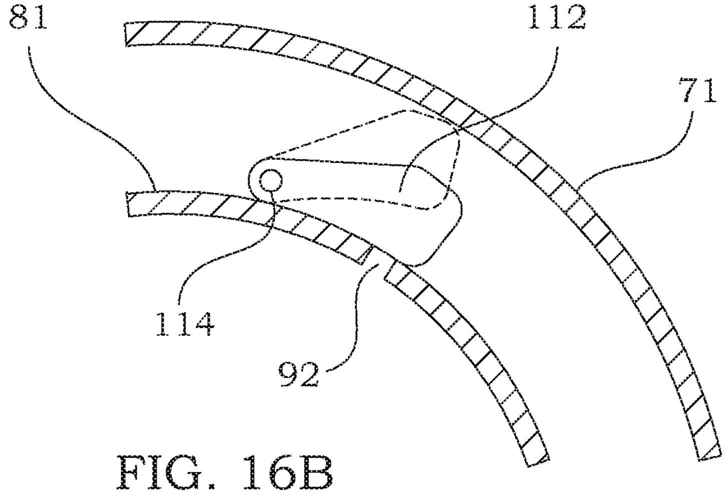
FIG. 16B is a radial cross-sectional view of the embodiment of the counter-recoil control system shown in FIG. 16A.

One embodiment of a counter-recoil control system 110 is shown in perspective in FIG. 16A, and FIG. 16B shows a radial cross-sectional view of the same embodiment. In the pictured embodiment of counter-recoil control system 110, the counter-recoil control valves 112 may be configured to control the maximum counter-recoil velocity by limiting the amount of fluid flow that may be used to drive the recoiling parts forward from their maximum recoil position behind latch to the latch position. At the same time the counter-recoil control system 110 has no influence on the performance of the throttling sleeve (i.e., the portion of the inner cylinder 81 between the maximum recoil position behind latch and the latch position) to successfully bring the recoiling parts to a controlled stop.

As shown in FIGS. 16A & 16B, the individual counter-recoil control valves 112 are forced outward via a pivoting action (about a counter-recoil control valve pivot point 114) during recoil by the fluid flowing out of the inner cylinder 81 as the gun recoils (best shown in FIG. 16B). After the recoiling parts stop adjacent the maximum recoil position behind latch, the recuperators' 56, 66 force on the fluid causes the fluid to flow back into the inner cylinder 81 through fluid passages 92 positioned rearward with respect to the partition 74. The fluid flow during this process causes certain counter-recoil control valves 112 to close, thereby covering the fluid passages 92 to the rear of the recoil piston 64. As the recoil piston 64 moves forward, more counter-recoil control valves 112 close fluid passages 92. Since fluid passages 92 to the rear of the recoil piston 64 are progressively closed as the recoil piston 64 and other recoiling parts move forward, the number of fluid passages 92 (and thus the flow area available to accelerate the recoiling parts) is limited, which in turn limits the maximum velocity that the recoiling parts may attain before reaching the latch position. Without the use of a counter-recoil system 110, in certain embodiments of the soft recoil system 10 the peak counter-recoil velocity may become elevated to the point that slowing of the recoiling parts to a stop at latch position will induce higher than desired forward loading on the carriage or other elements of the piece of the gun 12.

Figure 19:
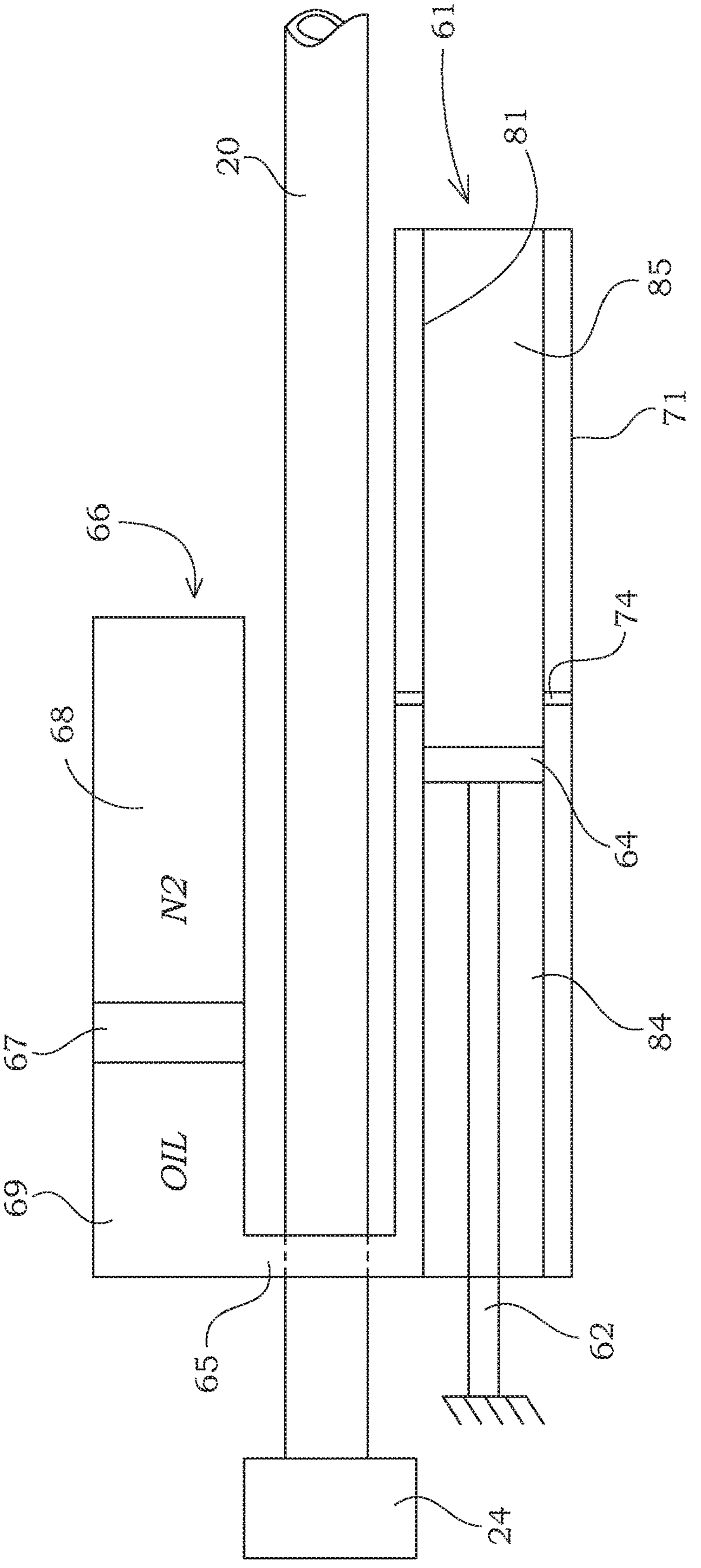
FIG. 19 is a cross-sectional, schematic view of a gun cooperatively engaged with another embodiment of a soft recoil system.

FIG. 19 provides a cross-sectional schematic view of another embodiment of the soft recoil system 10. The embodiment shown in FIG. 19 works substantially in the same manner as that of the embodiments of the soft recoil system 10 previously described herein. However, in the embodiment shown in FIG. 19, the recoil cylinder 61 and recuperator 66 may be directly mounted to the gun 12. The embodiment in FIG. 19 shows the recuperator 66 mounted above the gun 12 and the recoil cylinder 61 mounted below the gun 12. However, other orientations and/or configurations may be used without departing from the scope of the soft recoil system 10 as disclosed and claimed herein.

In the embodiment of a soft recoil system 10 shown in FIG. 19, the recoil cylinder 61 and recuperator 66 may move forward and rearward with the gun 12 in response to run-up, recoil, and counter-recoil forces, respectively. The recoil rod 62 may be secured to a cradle (not shown) and/or base 14. The gun 12, recoil cylinder 61, and/or recuperator 66 may be cooperatively engaged with the cradle and/or base 14 such that the gun 12, recoil cylinder 61, and/or recuperator 66 may move linearly in response to run-up, recoil, and counter-recoil forces. This cooperative engagement may be accomplished through the use of corresponding rails 28, 30 and rail guides 50, 60, or through any other structure and/or method suitable for the particular application of the soft recoil system 10.

In operation, the embodiment of a soft recoil system 10 shown in FIG. 19 may be configured such that all components of the gun 12, recoil cylinder 61, and recuperator 66 move forward and rearward in response to run-up, recoil, and counter-recoil forces, and the recoil rod 62 and recoil piston 64 remain static. Accordingly, it will be apparent to those skilled in the art that the embodiment of a soft recoil system 10 shown in FIG. 19 operates according to the same principals as the embodiment shown in FIGS. 6-10 as the recoil piston 64 moves linearly within an inner cylinder 81 in both embodiments. However, in the embodiment shown in FIG. 19, rather than fixing the position of the recoil cylinder 61 and recuperator 66 with respect to the base 14 and varying the position of the recoil rod 62 and recoil piston 64 with respect thereto, the position of the recoil rod 62 and piston 64 is fixed with respect to the base 14 and/or cradle, and the position of the recoil cylinder 61 and recuperator 66 may vary along a predetermined path. Accordingly, the soft recoil system 10 as disclosed and claimed herein is not limited by the absolute positions of the various components thereof. Furthermore, the embodiment shown in FIG. 19 may be employed with first and second recoil cylinders 51, 61 and first and second recuperators 56, 66 in a manner similar to that described for the embodiment of the soft recoil system 10 shown in FIGS. 1, 3, 4, & 12.

It is to be understood that the embodiment of the soft recoil system 10 shown in FIG. 19 may require a modification to the profile of fluid passages 87, 88, 89, 90, 92, and 94 as shown for the embodiment pictured in FIGS. 1, 3, 4, & 12. However, such modification is within the scope of the soft recoil system 10 as disclosed and claimed herein, and in light of the present disclosure will be apparent to a person of ordinary skill in the art.

The latch mechanism 200 may be positioned at any convenient location along the length of the soft recoil system 10 that is suitable for the particular embodiment thereof. In the illustrative embodiment of the soft recoil system 10 pictured herein, the latch mechanism 200 is engaged with the mounting bracket 57, which is adjacent the forward yoke 36 when the recoiling parts are in the latch position. However, other positions and/or orientations of the latch mechanism 200 may be used with the soft recoil system 10 without limiting the scope thereof.

Generally, the latch mechanism 200 functions to retain the recoiling parts in the latched position (as shown in FIGS. 5 & 6) prior to the run-up phase, during which the recoiling parts are released and accelerate forward (as shown in FIG. 7). As previously described herein, when in the latch position, the recoiling parts are possess a certain amount of potential energy from the pressurized fluid in the soft recoil system 10. Accordingly, the latch mechanism must be robust enough to secure the recoiling parts against the force of this pressurized fluid, yet operate to selectively release the recoiling parts in a manner sufficiently convenient and safe for the user. Furthermore, during the recoil phase the latch mechanism 200 must allow the recoiling parts to pass freely past the latch position (i.e., in a direction from the muzzle yoke 38 to the breech 24), but stop the recoiling parts at the latch position the end of the counter-recoil phase in preparation for the next cycle.

Figure 14:
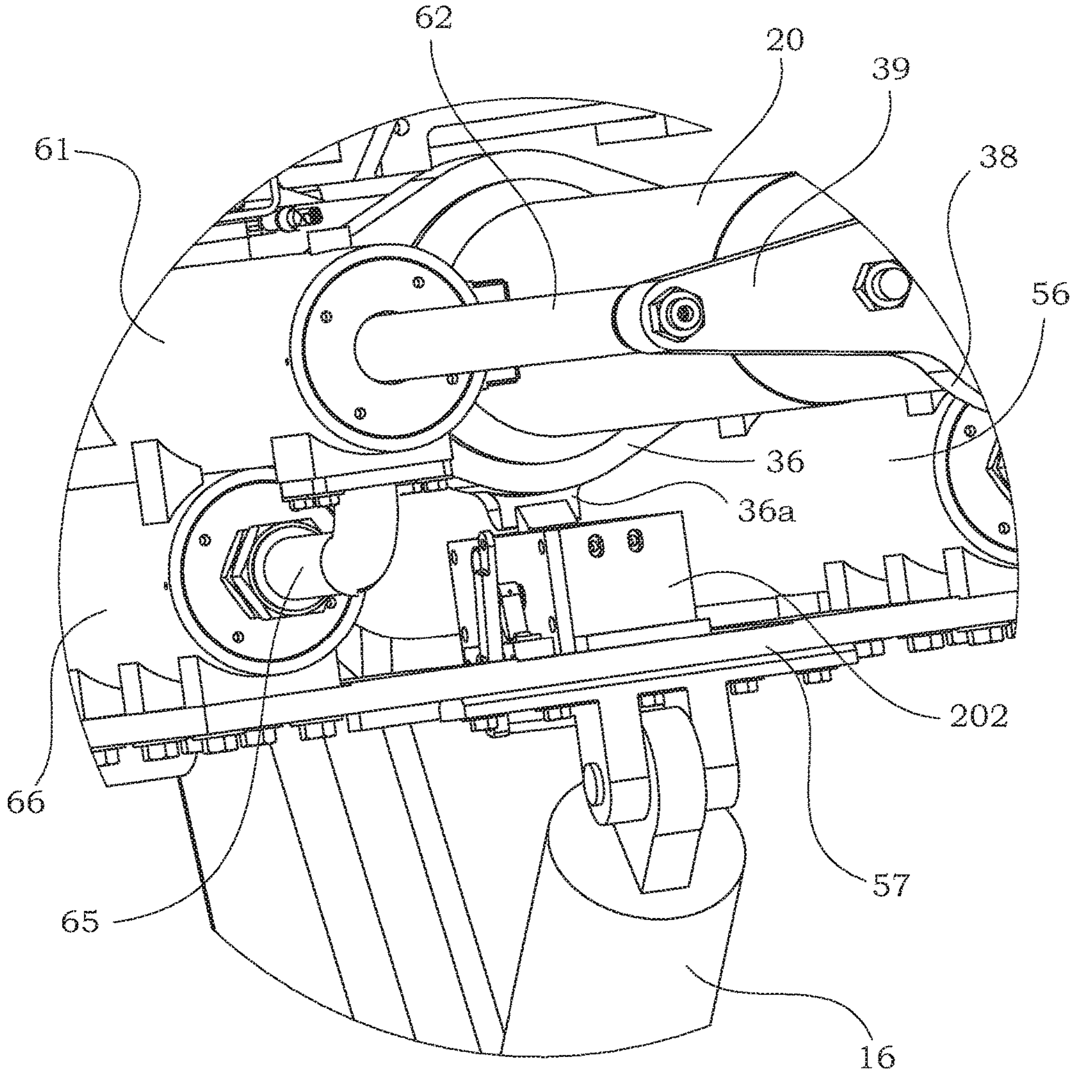
FIG. 14 is a perspective view of the illustrative embodiment of the soft recoil system and latch mechanism.
Figure 14A:
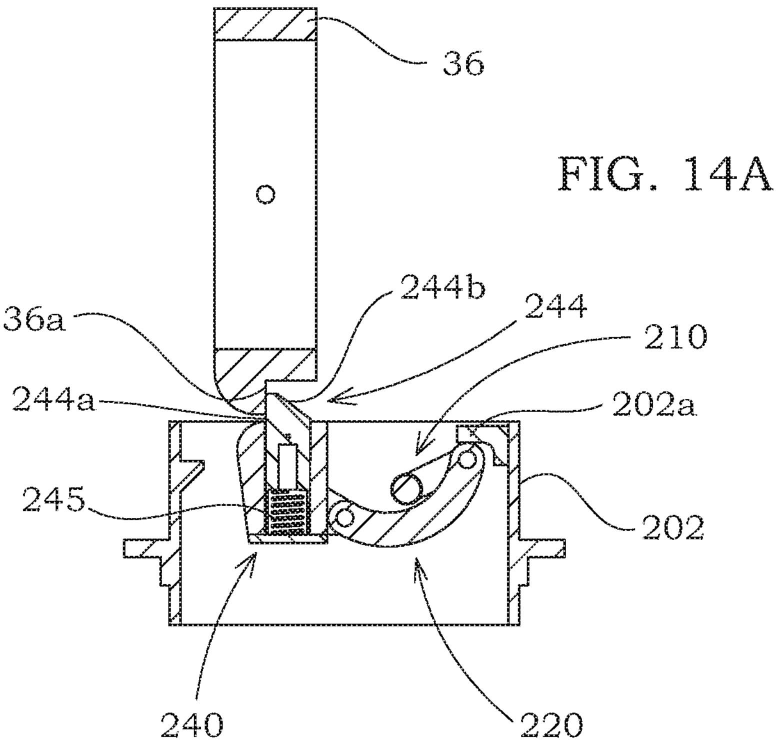
FIG. 14A is a cross-sectional view of how one embodiment of a latch mechanism interfaces with the recoiling parts via a latch point formed in the forward yoke, wherein the latch mechanism is retaining the recoiling parts.
Figure 14B:
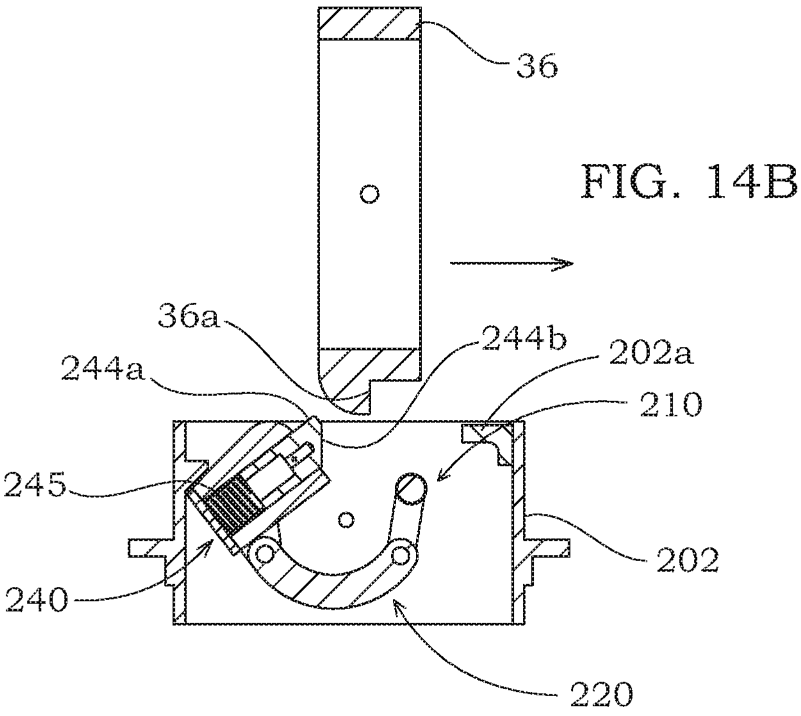
FIG. 14B is a cross-sectional view of how one embodiment of a latch mechanism interfaces with the recoiling parts via a latch point formed in the forward yoke, wherein the latch mechanism is positioned to release the recoiling parts.
Figure 14C:
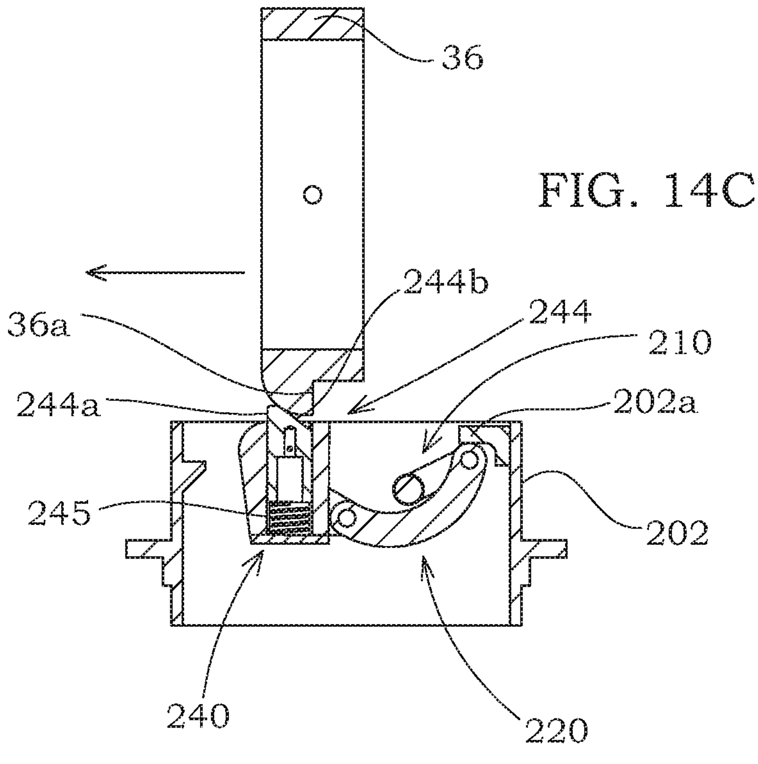
FIG. 14C is a cross-sectional view of how one embodiment of a latch mechanism interfaces with the recoiling parts via a latch point formed in the forward yoke, wherein the latch point is depressing the plunger.
Figure 17A:
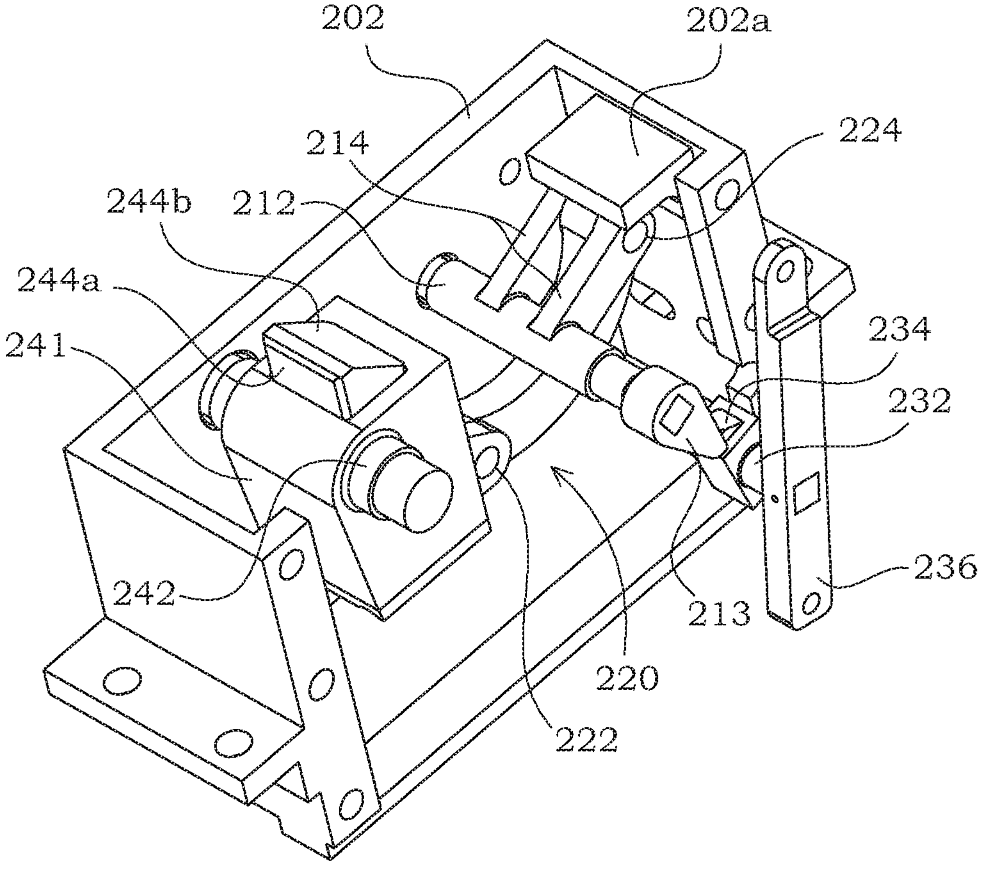
FIG. 17A is a perspective view of one embodiment of the internal elements of a latch mechanism that may be used with a soft recoil system wherein the latch mechanism is positioned to retain the recoiling parts.
Figure 17B:
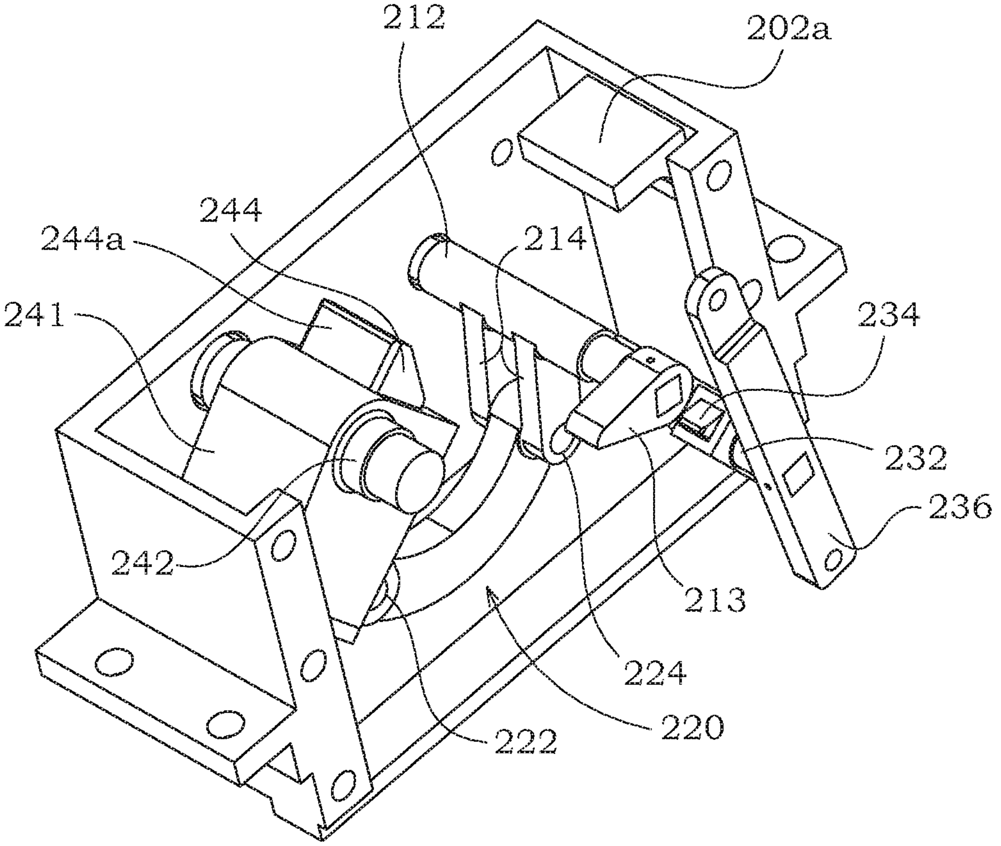
FIG. 17B is a perspective view of one embodiment of the internal elements of a latch mechanism that may be used with a soft recoil system wherein the latch mechanism is positioned to release the recoiling parts.
Figure 18A:
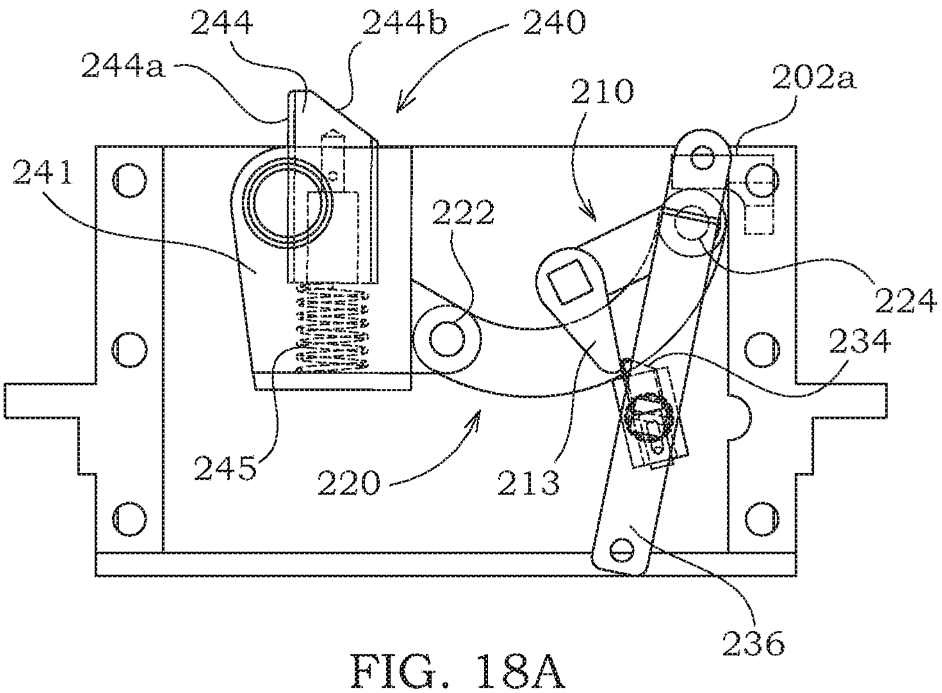
FIG. 18A is a cross-sectional view of the embodiment of the internal elements of the latch mechanism shown in FIG. 17 mounted to a housing, wherein the latch mechanism is positioned to retain the recoiling parts.
Figure 18B:
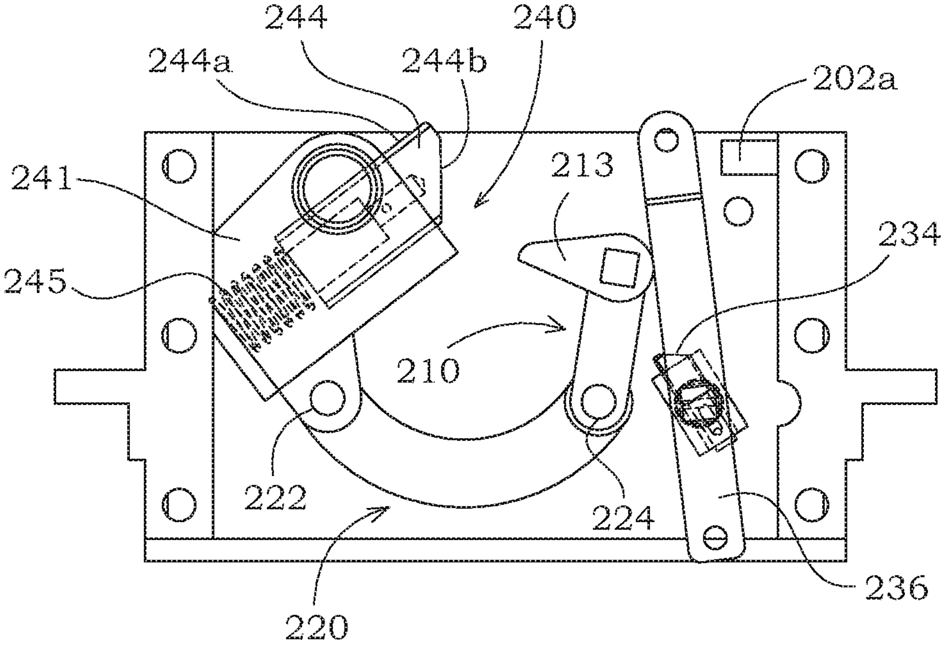
FIG. 18B is a cross-sectional view of the embodiment of the internal elements of the latch mechanism shown in FIG. 17 mounted to a housing, wherein the latch mechanism is positioned to release the recoiling parts.
Figure 18C:
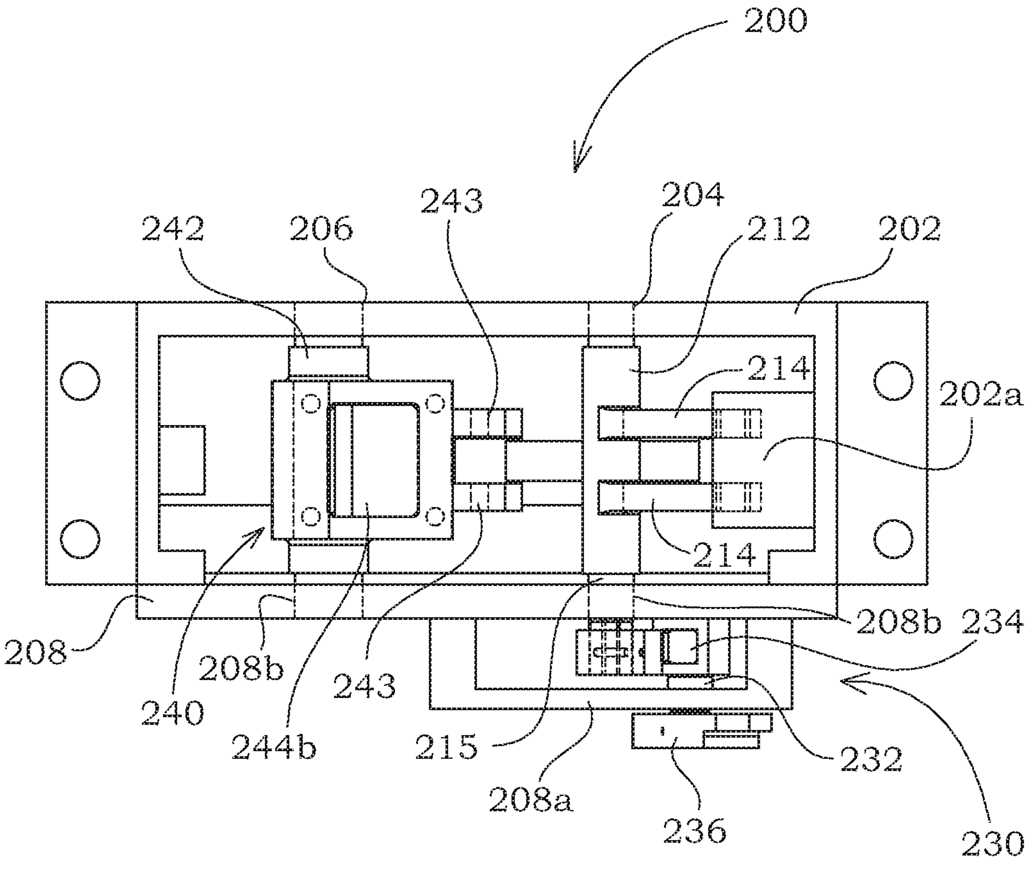
FIG. 18C is a top view of the embodiment of the internal elements of the latch mechanism shown in FIG. 17 mounted to a housing, wherein the latch mechanism is positioned to retain the recoiling parts.

Various views of one embodiment of a latch mechanism 200 that may be used with a soft recoil system 10 are shown in perspective in FIGS. 17A & 17B, wherein the internal elements of the latch mechanism 200 have been removed from a housing 202 for clarity. FIGS. 18A & 18B provide cross-sectional views of the embodiment of a latch mechanism 200 shown in FIGS. 17A & 17B, and FIG. 18C provides a top view thereof. The housing 202 pictured herein may be selectively engaged with a housing cover 208, which has been removed for clarity in FIGS. 17-18B, but which is shown in FIG. 18C. FIGS. 14A-14C provide a simplified cross-sectional view of how the embodiment of a latch mechanism 200 pictured herein may interface with the recoiling parts of the gun 12 and/or soft recoil system 10 via a latch point 36*a* secured to the forward yoke 36.

A latch assembly 240 may be pivotally engaged with a housing 202 via a latch assembly aperture 206 formed in the housing 202, a corresponding cover aperture 208*b* formed in the housing cover 208, and a latch assembly mount 242 formed in the latch assembly 240. In the illustrative embodiment of a latch assembly 240 pictured herein the latch assembly mount 242 is generally formed as a tube or rod that fits into the latch assembly aperture 206 and corresponding cover aperture 208*b*. However, the latch mechanism 200 and/or soft recoil system 10 disclosed and claimed herein is not limited by the configuration of the latch assembly aperture 206, housing cover 208, and/or the latch assembly mount 242. The latch assembly 240 may include a latch body 241 that is secured to the latch assembly mount 242. A link connector 243 (two link connectors 243 are shown in the illustrative embodiment pictured herein) may extend from the latch body 241 to provide a connection point for a link 220 described in detail below.

A plunger 244 may be positioned within a portion of the latch body 241. The plunger 244 may be selectively moveable in one dimension (i.e., the vertical dimension from the vantage shown in FIGS. 14A-14C, 18A & 18B) with respect to the latch body 241. The plunger 244 may be biased with respect to the latch body 241 in an upward direction via a biasing member 245, which is configured as a spring in the illustrative embodiment of the latch mechanism 200. The plunger 244 may include a plunger face 244*a* that interfaces the latch point 36*a* of the forward yoke 36 when the latch mechanism 200 is positioned to retain the recoiling parts in the latch position (as shown in FIGS. 14A, 17A & 18A). In the illustrative embodiment of the soft recoil system 10 pictured herein, the latch point 36*a* is configured to have an angled surface on the rearward side and a flat face on the forward side. The plunger 244 may also include a plunger ramp 244*b* opposite the plunger face 244*a* to interface the latch point 36*a* of the forward yoke 36 when the recoiling parts are moving rearward (i.e., toward the breech 24) during the recoil phase, which is shown in FIG. 14C.

The complimentary surfaces of the plunger 244 and latch point 36*a* facilitate movement of the recoiling parts in a rearward direction even when the latch point 36*a* contacts the plunger ramp 244*b* via the interaction between the angled surface of the latch point 36*a* and the plunger ramp 244*b* in conjunction with the biasing member 245, which is shown in FIG. 14C. The plunger face 244*a* interacts with the flat face of the latch point 36*a* to retain the recoiling parts (and/or stop the recoiling parts when they are moving forward during the counter-recoil phase) when the plunger 244 is in the extended position, which is shown in FIG. 14A. Other structures and/or methods of allowing relative movement of the recoiling parts with respect to the latch mechanism 200 in a first direction while limiting the amount of relative movement there between in a second direction may be employed with the latch mechanism 200 and/or soft recoil system 10 as disclosed herein without limitation.

The plunger ramp 244*b* in cooperation with the biasing member 245 allow a portion of the recoiling parts to move past the plunger 244 in a direction from the front of the gun 12 to the rear of the gun 12 when the latch point 36*a* overcomes the biasing force of the biasing member 245 (thereby pushing the plunger 244 down against the biasing force of the biasing member 245 as shown in FIG. 14C). The force required by the recoiling parts to overcome the upward biasing force of the biasing member 245 may be adjusted at least by the configuration of the latch point 36*a* (e.g., the angle of the surface that contacts the plunger 244), the configuration of the plunger ramp 244*b* (e.g., the angle of the plunger ramp 244*a* with respect to the surface of the latch point 36*a* that contacts the plunger ramp 244*b*), and the upward biasing force the biasing member 245 imparts to the plunger 244.

A crank 210 may be pivotally engaged with the housing 202 via a crank aperture 204 formed in the housing, a corresponding cover aperture 208*b* formed in the housing cover 208, and a crank mount 212 formed in the crank 210. In the illustrative embodiment of a crank 210 pictured herein, the crank mount 212 is generally formed as a tube or rod that fits into the crank aperture 204 and corresponding cover aperture 208*b*. However, the latch mechanism 200 and/or soft recoil system 10 disclosed and claimed herein is not limited by the configuration of the crank aperture 204, housing cover 208, and/or the crank mount 212. The crank may include a crank arm 214 (two of which are shown in the illustrative embodiment of a latch mechanism 200 pictured herein) extending from the crank mount 212.

A lever member 213 may be cooperatively engaged with the crank 210 such that the lever member 213 communicates mechanical forces to the crank 210 and vice versa. In the illustrative embodiment of the latch mechanism 200, the lever member 213 is operable to communicate at least rotational forces to the crank 210 via the crank mount 212, and is positioned on the exterior of the housing cover 208. A rotational biasing member 215, which may be configured as a torsion spring in certain embodiments of the latch mechanism 200, may bias the crank 210 in a counterclockwise direction from the vantage shown in FIGS. 18A & 18B. The housing 202 may be configured with a stop wall 202*a* to limit the degree of rotation the crank 210 may experience with respect to the housing 202. Generally the stop wall 202*a* will provide a limit to the rotation of the crank 210 due to rotational biasing force that the rotation biasing member 215 imparts to the crank 210. The position of the stop wall 202*a* may be adjustable to optimize how the latch mechanism 200 functions for a specific application of the soft recoil system 10.

A link 220 may communicate mechanical forces between the crank 210 and the latch assembly 240. A link first end 222 may be pivotally engaged with the latch assembly 240 at the link connector(s) 243. A link second end 224 may be pivotally engaged with the crank 210 at the distal end of the lever member(s) 213. In the illustrative embodiment of a latch mechanism 200 pictured herein, the link 220 is curved downward from the vantage depicted in FIGS. 18A & 18B. This allows the axis of rotation of the crank 210 (generally the radial centerline of the crank aperture 204 and crank mount 212) to be positioned below a line connecting the rotational axis of the link first end 222 and the rotational axis of the link second end 224 (referred to herein as "the connecting line").

When the latch mechanism 200 is in the position shown in FIGS. 14A, 17A, and 18A, the latch mechanism 200 prevents the recoiling parts from moving forward (i.e., to the right from the vantage depicted in FIGS. 14A, 18A & 18B). In this position, the latch point 36*a* directly contacts the plunger face 244*a*, and imparts a rotational biasing force in the clockwise direction to the latch assembly 240. However, as long as axis of rotation of the crank mount 212 with respect to the crank aperture 204 remains below the connecting line (as defined above), that rotational biasing force will not result in any linear or rotational motion of any parts of the gun 12 and/or soft recoil system 10.

A trip assembly 230 may be pivotally engaged with a housing cover 208 via a trip assembly bracket 208*a* formed in the housing cover 208 and a trip mount 232 formed in the trip assembly 230. In the illustrative embodiment of a trip assembly 230 pictured herein, the trip assembly bracket 208*a* is generally formed as a channel bracket having at least one aperture, wherein the trip assembly bracket 208*a* is engaged with the exterior surface of the housing cover 208, and the trip mount 232 is generally formed as a tube or rod that fits into the aperture formed in the trip assembly bracket 208*a* and a corresponding cover aperture 208*b*. However, the latch mechanism 200 and/or soft recoil system 10 disclosed and claimed herein is not limited by the configuration of the trip assembly bracket 208*a*, housing cover 208, and/or the trip mount 232. A lever member engager 234 may extend from the trip assembly 230 to engage the lever member 213 when the crank 210 and trip assembly 230 are in a certain orientation with respect to one another.

To release the recoiling parts (and thereby begin the run-up phase), a user may rotate the trip assembly 230 in a counterclockwise direction. This may be done manually via pulling a lanyard that is connected to the trip assembly 230. The illustrative embodiment of the trip assembly 230 includes a bar 236 engaged with the trip assembly such that rotating the bar 236 causes the trip assembly 230 to rotate. The bar 236 may serve as an attachment point for a lanyard. Additionally, a safety mechanism may be engaged with the housing 202 adjacent the bar 236 to prevent an unwanted release of the latch mechanism 200.

The rotation of the trip assembly 230 causes the lever member engager 234 to contact the lever member 213. Continuing to rotation the trip assembly 230 in a counterclockwise direction causes the lever member 213 to rotate in a clockwise direction, which causes the crank 210 to rotation in a clockwise direction. This rotation of the crank 210 causes the link second end 224 to move down with respect to the link first end 222. When the connecting line passes below the axis of rotation of the crank mount 212 with respect to the crank aperture 204, the rotational biasing force the latch point 36*a* imparts to the latch assembly 240 via the plunger 244 will cause the latch assembly 240 to rotate clockwise, thereby releasing the recoiling parts and beginning the run-up phase (which position of the latch mechanism 200 is depicted in FIGS. 14B, 17B & 18B).

After the recoiling parts have been released from the latch mechanism 200 and the run-up phase has begun, the rotational biasing member 215 may be configured such that it causes the crank 210 to rotate counterclockwise until the distal end of the crank arm(s) 214 and/or link second end 224 engage the stop wall 202*a*, which resets the latch mechanism 200.

When the recoiling parts are moving rearward during the recoil phase, the latch point 36*a* on the recoiling parts will typically pass the latch position. The latch point 36*a* will typically overcome the biasing force that the biasing member 245 places on the plunger 244 due to the kinetic energy of the recoiling parts, thereby depressing the plunger 244 and allowing the recoiling parts to pass freely rearward of the latch position (as shown in FIG. 14C). After the latch point 36*a* has passed rearward of the latch position, the biasing member 245 is designed to return the plunger 244 to the extended position (shown in FIGS. 14A, 17A & 18A) so it may engage the latch point 36*a* during the counter-recoil phase.

The link 220 in the illustrative embodiment of the latch mechanism 200 is designed to serve two functions, both of which may be achieved through a curved configuration of the link 220 as shown for the illustrative embodiment of a latch mechanism 200 as pictured herein. First, as part of the over-centered linkage system comprised of the crank 210, link 220, and latch assembly 240, the link 220 cooperates to hold the latch assembly 240 in position to overcome the potential energy of the compressed fluid in the soft recoil system 10 and thereby selectively prevent the recoiling parts from accelerating forward (i.e., entering the run-up phase). Secondly, the link 220 provides a shock absorbing capacity to the latch mechanism 200. When the recoiling parts impact the plunger 244 during the counter-recoil phase, the tensile load imparted to the link 220 causes the curvature of the link 200 to straighten, thereby slightly lengthening the link 220. This lengthening of the link 220 absorbs a portion of the impact energy recoiling parts impart to the latch mechanism in much the same way a spring would absorb that energy. It is contemplated that in the illustrative embodiment of the latch mechanism 200, the link 220 will absorb normal impact loads without permanent deformation. It is also contemplated that the link 220 in the illustrative embodiment of the latch mechanism 200 will provide additional protection from damage to the various elements of the latch mechanism 200 (which damage may be caused by excessive impact loads) by straightening to the point that the over-center distance in the retaining position of the latch mechanism (shown in FIGS. 17A & 18A) is reduced to the point that it becomes negative. At this point the latch mechanism 200 would release the recoiling parts preventing possible damage to the latch mechanism 200. Such excessive impact loads may be caused by counter-recoil control problems, and it is contemplated that a user should investigate the cause of such counter-recoil control problems before resuming normal operation.

Although the latch mechanism 200 pictured herein is generally manually operated, the latch mechanism 200 and/or soft recoil system 10 as disclosed and claimed herein is not so limited. The latch mechanism 200 may be outfitted with multiple layers of automation and/or actuation. For example, in an embodiment not pictured herein, the rotation of the trip assembly 230 may be caused by an electrical, pneumatic, or other type of powered actuator. Additionally, the rotational biasing member 215 and biasing member 245 may be electrical, pneumatic, or otherwise externally powered as opposed to being configured as mechanical springs.

The magnitude of the force(s) the rotational biasing member 215 imparts to the crank 210 and that the biasing member 245 imparts to the plunger 244 will vary from one embodiment of the latch mechanism 200 to the next, and are therefore in no way limiting to the scope thereof or to the scope of the soft recoil system 10. Similarly, the force required to rotate the lever member 213 to a point at which the over-center orientation of the crank 210, link 220, and latch assembly 240 is eliminated will vary from one embodiment of the latch mechanism 200 to the next, and are therefore in no way limiting to the scope thereof or to the scope of the soft recoil system 10.

In the embodiment pictured herein, it is contemplated that the latch mechanism 200 may be secured to the mounting bracket 57 adjacent the end of the actuator 16 opposite the base 14. However, the latch mechanism 200 may be secured to any other suitable structure for the particular embodiment of the gun 12, base 14, and/or soft recoil system 10 without limitation. The various components of the latch mechanism 200 may be constructed of any suitable material for the particular application of the latch mechanism 200. Such materials include but are not limited to metal, metallic alloys, synthetic materials, and combinations thereof.

The optimal dimensions and/or configuration of the yokes 32, 34, 36, flange 39, tie rods 40, rail guides 50, 60, recoil cylinders 51, 61, recoil rods 52, 62, recuperators 56, 66, recoil piston(s) 64, mounting bracket 57, crossover bracket 59, floating piston 67, outer cylinder 71, partition 74, inner cylinder 81, stop element 83, check valve 100, latch mechanism 200, counter-recoil control valve 110, misfire recovery system 130, and various components thereof or interacting there with will vary from one embodiment of the soft recoil system 10 to the next, and are therefore in no way limiting to the scope thereof.

A gun 12 outfitted with the illustrative embodiment of the soft recoil system 10 disclosed herein conserves a portion of the energy from the firing of the round rather than simply dissipating that energy. The soft recoil system 10 then uses that conserved energy to offset the recoil from the firing of the next round. This allows for a faster cycle time in firing (with cycle times being reduced by as much as 50%) and longer periods of effective use. Because less energy is transferred to the fluid in the soft recoil system 10 than that in prior art systems (which reduction is equal to the energy required to stop the recoiling parts during the "run-up" phase), the fluid stays cooler during use as compared to prior arty systems.

The components of the soft recoil system 10 may be made any materials having the desired characteristics for the specific application of the soft recoil system 10 including but not limited to metals, metallic alloys, synthetic materials, and/or combinations thereof. For example, it is contemplated that for some applications of the soft recoil system 10 it will be advantages to construct the inner cylinder 81 using high-strength steel. Since the internal surfaces of the outer and inner cylinders 71, 81 may be exposed to high pressures, the internal surface of the cylinders 71, 81 must be strong enough to resist bursting. Additionally, it is contemplated that the inner cylinder 81 must be configured so that it resists deformation to mitigate leakage between it and recoil piston 64. The material used for the inner cylinder 81 must also exhibit a high degree of wear resistance as the recoil piston 64 moves forward and rearward repeatedly therein. While other materials might be selected (including but not limited to metal, metallic alloys, synthetic materials, and/or combinations thereof), high-strength steel may be a preferred choice for various embodiments of the soft recoil system 10 when considering cost, weight, and performance.

In certain applications of the soft recoil system 10 the recoil rods 52, 62 may be made from high-strength steel with a chrome-plated outside diameter. The high-strength steel provides the necessary strength and resistance to buckling. The chrome plating provides the degree of corrosion resistance necessary and functions efficiently for the dynamic seal interface purposes. It is contemplated that in the illustrative embodiment of the soft recoil system 10 the recoil piston 64 may be made from materials such as nodular cast iron or bronze. Both of these materials provide a certain amount of natural lubricity for sliding on materials such as steel. However, other materials may be used without limitation.

It is contemplated that for the illustrative embodiment of the soft recoil system 10, the outer cylinder 71 may be made from medium-strength aluminum. Since the high-pressure operations are generally confined to the inside of the inner cylinder 81, lower strength, lighter weight materials may be used for fluid transfer functions and lighter structural requirements. However, other materials may be used without limitation. Inasmuch as the soft recoil system 10 described and disclosed herein is subject to many variations, modifications and changes in detail, it is intended that all matter contained in the forgoing description or shown in the accompanying drawings shall be interpreted as illustrative and not in a limiting sense.

Although the specific embodiments pictured and herein pertain to a soft recoil system 10 adapted for use with a howitzer artillery piece, the soft recoil system 10 may be adapted for use with other types of gun 12, such as mortars. Additionally, it is contemplated that the soft recoil system 10 may be adapted for use with artillery pieces other than those shown herein, wherein those artillery pieces fire different rounds, have barrels 20 of differing lengths, are mounted to different structures, or are generally designed for different uses than the gun 12 pictured herein. Accordingly, it is contemplated that certain embodiments of the soft recoil system 10 may be adapted for use with artillery weapons of various sizes and mortar weapons of various sizes, regardless of whether such weapons are vehicle mounted or otherwise.

The soft recoil system 10 may be configured with other orientations and/or with different quantities of the various elements having different shapes and/or orientations than those shown and described herein without limitation. Accordingly, the scope of the soft recoil system 10 is in no way limited by the specific shape and/or dimensions of the barrel 20, rails 28, 30, yokes 32, 34, 36, flange 39, tie rods 40, rail guides 50, 60, recoil cylinders 51, 61, recoil rods 52, 62, recuperators 56, 66, recoil piston(s) 64, mounting bracket 57, crossover bracket 59, floating piston 67, outer cylinder 71, partition 74, inner cylinder 81, stop element 83, check valve 100, or the relative quantities and/or positions thereof.

Having described the preferred embodiment, other features, advantages, and/or efficiencies of the soft recoil system 10 will undoubtedly occur to those versed in the art, as will numerous modifications and alterations of the disclosed embodiments and methods, all of which may be achieved without departing from the spirit and scope of the soft recoil system 10 as disclosed and claimed herein. It should be noted that the soft recoil system 10 is not limited to the specific embodiments pictured and described herein, but are intended to apply to all similar apparatuses for mitigating recoil force and/or conserving the energy expended during the firing of a round. Modifications and alterations from the described embodiments will occur to those skilled in the art without departure from the spirit and scope of the soft recoil system 10.

The invention claimed is:

1. A soft recoil system for mitigating a force of firing a round, the soft recoil system comprising:

a. a hydraulic cylinder cooperatively engaged with a gun barrel, the hydraulic cylinder comprising:

i. an outer cylinder;

ii. an inner cylinder rigidly mounted within the outer cylinder, wherein the inner cylinder includes a group of unobstructed passages formed through the inner cylinder, the group of unobstructed passages having a first unobstructed passage with a first width and a second unobstructed passage with a second width that is different from the first width;

iii. a recoil piston positioned within the inner cylinder, wherein the soft recoil system is slideable along a stroke length with respect to the inner cylinder along a portion of the inner cylinder, the group of unobstructed passages arranged along the stroke length;

iv. an elongated recoil rod having a first end portion cooperatively engaged with the gun barrel and a second end cooperatively engaged with the recoil piston;

b. a recuperator having a floating piston positioned therein, wherein the floating piston defines a first recuperator chamber and a second recuperator chamber, wherein the hydraulic cylinder and the second recuperator chamber are in fluid communication with one another; and c. a fluid occupying a portion of the inner cylinder, the outer cylinder, and the second recuperator chamber, wherein the soft recoil system captures a portion of an energy imparted to the gun barrel after the firing of the round by allowing the recoil piston to displace a first volume of the fluid from the inner cylinder into the outer cylinder through the group of unobstructed passages, and wherein the group of unobstructed passages cooperate to throttle a rate at which the recoil piston displaces the first volume of the fluid.

2. The soft recoil system according to claim 1, wherein the first recuperator chamber is filled with a compressible gas.

3. The soft recoil system according to claim 2, further comprising a partition cooperatively engaged with a portion of an exterior of the inner cylinder and a portion of an interior of the outer cylinder, wherein the partition supports the inner cylinder within the outer cylinder, wherein the partition is formed with a port therein, and wherein the partition defines a forward outer chamber and a rear outer chamber.

4. The soft recoil system according to claim 3, further comprising a check valve slideably engaged with a portion of the inner cylinder adjacent the partition, wherein the check valve allows the fluid in the rear outer chamber to flow through the check valve into the forward outer chamber but prevents the fluid in the forward outer chamber from flowing through the check valve into the rear outer chamber.

5. The soft recoil system according to claim 1, further comprising a transfer manifold positioned to fluidly connect the hydraulic cylinder to the first recuperator chamber.

6. The soft recoil system according to claim 5, wherein the soft recoil system is configured to be mounted directly above the gun barrel.

7. The soft recoil system according to claim 6, wherein the soft recoil system is configured to be mounted directly below the gun barrel.

8. The soft recoil system according to claim 6, wherein the hydraulic cylinder and the recuperator are secured to a base, such that the gun barrel, recoil piston, and recoil rod move with respect to the base, hydraulic cylinder and the recuperator during firing of the round.

9. The soft recoil system according to claim 6, wherein the recoil rod is secured to a base, and wherein the hydraulic cylinder and the recuperator are secured to a gun, such that the gun, hydraulic cylinder, and recuperator move with respect to the base, recoil rod, and recoil piston during firing of the round.

10. The soft recoil system according to claim 6, further comprising:

a. a second hydraulic cylinder;

b. a second recuperator having a floating piston positioned therein, wherein the floating piston defines a first recuperator chamber and a second recuperator chamber, wherein the second hydraulic cylinder and the first recuperator chamber are in fluid communication with one another; and, c. a crossover bracket securing the hydraulic cylinder, the recuperator, the second hydraulic cylinder, and the second recuperator relative to one another.

11. The soft recoil system according to claim 10, wherein the soft recoil system is configured so that a gun may be positioned between the hydraulic cylinder and the second hydraulic cylinder.

12. A method for conserving energy expended during a firing of a round in a gun using a soft recoil system, the method comprising the steps of:

a. operably engaging a piston slideably positioned in an inner cylinder of a first fluid chamber of a soft recoil system with the gun such that the piston may move linearly along a stroke length with respect to the first fluid chamber;

b. using the piston to displace a first volume of a fluid positioned in the inner cylinder in response to the firing of the round;

c. throttling a rate at which the piston displaces the first volume of the fluid using a group of unobstructed passages formed through the inner cylinder and arranged along the stroke length, the group of unobstructed passages having a first unobstructed passage with a first width and a second unobstructed passage with a second width that is different from the first width;

d. capturing a first portion of an energy required to displace the first volume of the fluid and, e. releasing at least a part of the first portion of the energy required to displace the first volume of the fluid such that the at least a part of the first portion of the energy causes the piston to move with respect to the first fluid chamber.

13. The method according to claim 12, wherein the step of capturing the first portion of the energy required to displace the first volume of the fluid is performed, in part, using a second fluid, wherein the second fluid is compressible.

14. The method according to claim 13, wherein the soft recoil system is further defined as comprising a recuperator and a floating piston positioned in the recuperator, wherein the floating piston divides the recuperator into a first recuperator chamber and a second recuperator chamber each having a variable volume, wherein the fluid is in fluid communication with the second recuperator chamber, and wherein the second fluid is positioned in the first recuperator chamber.

15. The method according to claim 14, wherein the soft recoil system is further defined as comprising a latch mechanism, wherein the latch mechanism is configured to prevent movement of the piston during the step of storing the first portion of the energy required to displace the first volume of the fluid.

16. The method according to claim 15, wherein the inner cylinder has a forward inner chamber and a rear inner chamber, wherein the inner cylinder is positioned within an outer cylinder having a forward outer chamber and a rear outer chamber, wherein the forward inner and outer chambers are formed with a fluid passage therein to allow fluid to pass from the inner cylinder to the outer cylinder and vice versa.

* * * * *